(12) United States Patent
Ichikawa

(10) Patent No.: US 11,254,234 B2
(45) Date of Patent: Feb. 22, 2022

(54) CONNECTED VEHICLE

(71) Applicant: TOYOTA JIDOSHA KABUSHIKI KAISHA, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 15/833,561

(22) Filed: Dec. 6, 2017

(65) Prior Publication Data

US 2018/0164121 A1 Jun. 14, 2018

(30) Foreign Application Priority Data

Dec. 14, 2016 (JP) .............................. JP2016-242063

(51) Int. Cl.
| | |
|---|---|
| *B60L 58/13* | (2019.01) |
| *G01C 21/34* | (2006.01) |
| *G07C 5/08* | (2006.01) |
| *G01C 21/36* | (2006.01) |
| *G07C 5/00* | (2006.01) |

(Continued)

(52) U.S. Cl.
CPC .......... *B60L 58/13* (2019.02); *G01C 21/3469* (2013.01); *G01C 21/3697* (2013.01); *G07C 5/008* (2013.01); *G07C 5/0841* (2013.01); *B60K 6/22* (2013.01); *B60K 2370/169* (2019.05); *B60L 2240/54* (2013.01); *B60L 2240/622* (2013.01); *B60L 2240/70* (2013.01); *B60L 2260/52* (2013.01); *B60L 2260/54* (2013.01); *B60W 2050/146* (2013.01); *B60W 2556/45* (2020.02); *Y02T 10/84* (2013.01)

(58) Field of Classification Search
CPC . G01C 21/3697; G01C 21/3469; B60L 58/13; B60L 2240/54; B60L 2240/622; B60L 2240/70; B60L 2260/52; B60L 2260/54; G07C 5/008; G07C 5/0841; B60K 2370/169; B60K 6/22; B60W 2050/146; B60W 2550/40; Y02T 10/84
See application file for complete search history.

(56) References Cited

U.S. PATENT DOCUMENTS

2012/0116606 A1* 5/2012 Ichinokawa ........... B60K 35/00
701/1
2012/0123618 A1* 5/2012 Kinser ..................... G07C 5/08
701/22

(Continued)

FOREIGN PATENT DOCUMENTS

JP 2012-100474 A 5/2012

*Primary Examiner* — Thomas E Worden
(74) *Attorney, Agent, or Firm* — Oliff PLC

(57) ABSTRACT

A connected vehicle is able to communicate with a server. The server is configured to collect result data indicating traveling results of a plurality of vehicles. The connected vehicle includes a communication device configured to receive data from the server and a control device configured to calculate a travelable range of the connected vehicle. The control device is configured to calculate the travelable range based on data in which the travelable range is shorter among first data and second data. The first data is calculated based on traveling results of the connected vehicle and is correlated with the travelable range. The second data is calculated based on the result data collected in the server and is correlated with the travelable range.

2 Claims, 12 Drawing Sheets

(51) Int. Cl.
*B60K 6/22* (2007.10)
*B60W 50/14* (2020.01)

(56) References Cited

U.S. PATENT DOCUMENTS

| | | | | |
|---|---|---|---|---|
| 2012/0283902 | A1* | 11/2012 | Kusumi | B60L 53/14 |
| | | | | 701/22 |
| 2013/0325403 | A1* | 12/2013 | Lange | G01C 21/3453 |
| | | | | 702/181 |
| 2014/0074329 | A1* | 3/2014 | Yang | B60L 58/12 |
| | | | | 701/22 |
| 2014/0163854 | A1* | 6/2014 | Matsumoto | B60L 53/665 |
| | | | | 701/123 |
| 2015/0051763 | A1* | 2/2015 | Enomoto | B60L 11/1862 |
| | | | | 701/22 |
| 2015/0127204 | A1* | 5/2015 | Hoesterei | G01C 21/3469 |
| | | | | 701/22 |
| 2016/0153796 | A1* | 6/2016 | Stankoulov | B60W 40/1005 |
| | | | | 701/123 |
| 2016/0243959 | A1* | 8/2016 | Kishida | B60W 20/13 |
| 2017/0213137 | A1* | 7/2017 | Geller | G01C 21/3484 |
| 2017/0369048 | A1* | 12/2017 | Delobel | B60W 20/13 |
| 2018/0354526 | A1* | 12/2018 | Schuller | B60L 15/20 |
| 2019/0226861 | A1* | 7/2019 | Schimik | G01C 21/3469 |

* cited by examiner

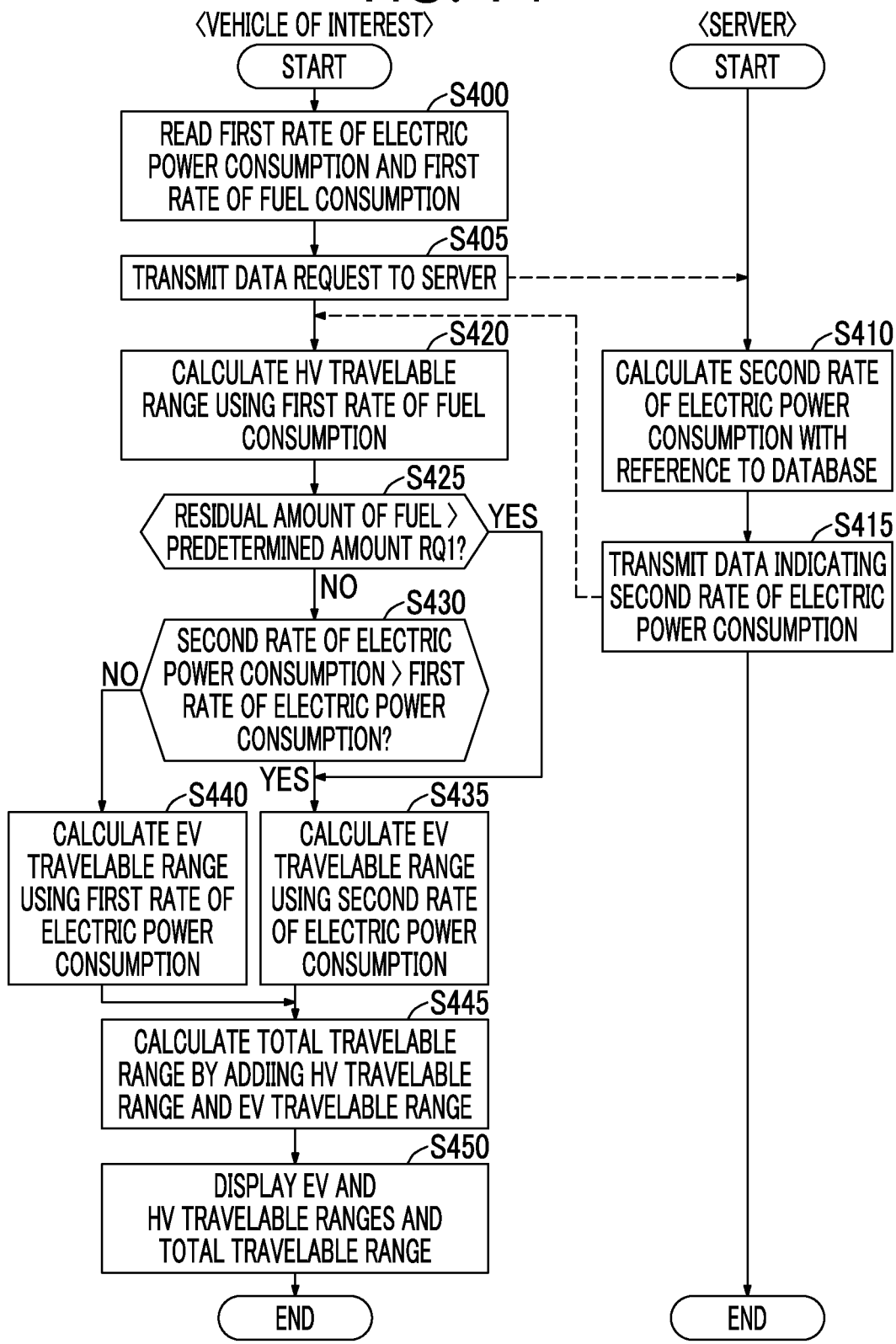

CONNECTED VEHICLE

INCORPORATION BY REFERENCE

The disclosure of Japanese Patent Application No. 2016-242063 filed on Dec. 14, 2016 including the specification, drawings and abstract is incorporated herein by reference in its entirety.

BACKGROUND

1. Technical Field

The present disclosure relates to a connected vehicle and more particularly to a connected vehicle that can communicate with a server.

2. Description of Related Art

Japanese Patent Application Publication No 2012-100474 (JP 2012-100474 A) discloses a vehicle including a display unit. In such a vehicle, a travelable range is calculated based on result values of a traveling distance, an amount of electric power consumed, and a residual amount of battery power. Then, an image indicating the calculated travelable range is displayed on the display unit (see JP 2012-100474 A).

SUMMARY

In the vehicle disclosed in JP 2012-100474 A, the travelable range is calculated using traveling results (result values of a traveling distance and an amount of electric power consumed) of the vehicle of interest. Since it is difficult to accurately predict a rate of electric power consumption (Wh/km) in a route in which the vehicle will travel in the future from only the traveling results of the vehicle of interest and the like, accuracy of the calculated travelable range is not high. Accordingly, an actual travelable range may be shorter than the calculated travelable range.

The present disclosure provides a connected vehicle that can communicate with a server and reduce a likelihood that an actual travelable range will be shorter than a calculated travelable range.

A connected vehicle according to the present disclosure is able to communicate with a server. The server is configured to collect result data indicating traveling results of a plurality of vehicles. The connected vehicle includes a communication device and a control device. The communication device is configured to receive data from the server. The control device is configured to calculate a travelable range of the connected vehicle. The control device is configured to calculate the travelable range based on data in which the travelable range is shorter among first data and second data. The first data is calculated based on traveling results of the connected vehicle and is correlated with the travelable range. The second data is calculated based on the result data collected in the server and is correlated with the travelable range.

In the connected vehicle, the travelable range is calculated based on the data in which the travelable range is shorter among the first data which is calculated based on the traveling result of the vehicle of interest and the second data which is calculated based on the traveling results of the plurality of vehicles collected in the server. Accordingly, for example, when the travelable range for the case of using the second date is shorter than that for the case of using the first data, the calculated travelable range is shorter than the travelable range for the case of using only the first data. As a result, according to the connected vehicle, it is possible to reduce a likelihood that the actual travelable range will be shorter than the calculated travelable range.

The connected vehicle according to the present disclosure may further include an internal combustion engine, a fuel tank, an electrical rotary machine, and a power storage device. The fuel tank may be configured to store fuel of the internal combustion engine. The power storage device may be configured to store electric power to be supplied to the electrical rotary machine. The control device may be configured to calculate the travelable range with the electric power (an EV travelable range) based on one of the first and second data and to calculate the travelable range with the fuel (an HV travelable range) based on the data in which the travelable range with the fuel is shorter among the first and second data.

In the connected vehicle, the travelable range with fuel is calculated based on the data in which the travelable range with fuel is shorter among the first and second data. Accordingly, according to the connected vehicle, since a likelihood that the travelable range with fuel will be calculated to be longer than the actual travelable range is reduced, a likelihood that the whole travelable range with electric power and fuel will be calculated to be longer than the whole actual travelable range is also reduced.

The connected vehicle according to the present disclosure may further include an internal combustion engine, a fuel tank, an electrical rotary machine, and a power storage device. The fuel tank may be configured to store fuel of the internal combustion engine. The power storage device may be configured to store electric power to be supplied to the electrical rotary machine. The control device may be configured to calculate the travelable range with the electric power based on the data in which the travelable range with the electric power is shorter among the first and second data when an SOC of the power storage device is greater than a predetermined value and the residual amount of fuel is equal to or less than a predetermined amount. The control device may be configured to calculate the travelable range with the electric power based on one of the first and second data when the SOC is greater than the predetermined value and the residual amount of fuel is greater than the predetermined amount.

In the connected vehicle, when the SOC of the power storage device is greater than the predetermined value and the residual amount of fuel is greater than the predetermined amount, the travelable range with electric power is calculated based on any one of the first and second data. When the SOC of the power storage device is greater than the predetermined value and the residual amount of fuel is equal to or less than the predetermined amount, the travelable range with electric power is calculated based on the data in which the travelable range is shorter among the first and second data. Accordingly, according to the connected vehicle, in a situation in which it is relatively important to calculate the travelable range with electric power to be shorter than the actual travelable range when the SOC of the power storage device is greater than the predetermined value and the residual amount of fuel is equal to or less than the predetermined amount, it is possible to reduce a likelihood that the travelable range with electric power will be calculated to be shorter than the actual travelable range.

In the connected vehicle according to the present disclosure, the second data may be calculated by the server. The communication device may be configured to receive the second data from the server.

In the connected vehicle, since it is not necessary to calculate the second data in the vehicle, it is possible to calculate the travelable range with a calculation load less than that when the second data is calculated in the vehicle.

In the connected vehicle according to the present disclosure, the communication device may be configured to receive the result data from the server. The control device may be configured to calculate the second data based on the result data.

In the connected vehicle, since the second data is calculated in the vehicle, it is possible to change an algorithm for calculating the second data by only updating a control program in the vehicle, for example, when it is necessary to improve the algorithm for calculating the second data.

The connected vehicle according to the present disclosure may further include a display device. The display device may be configured to display an image. The control device may be configured to control the display device such that an image indicating the travelable range is displayed.

In the connected vehicle, an image indicating the calculated travelable range is displayed on the display device. Accordingly, a user of the connected vehicle can recognize the travelable range by viewing the display device.

According to the present disclosure, it is possible to reduce a likelihood that an actual travelable range will be shorter than a calculated travelable range in a connected vehicle that is able to communicate with a server.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14 is a flowchart illustrating routines which are performed in a vehicle of interest and a server to display various travelable ranges on a display device in a third embodiment.

DETAILED DESCRIPTION OF EMBODIMENTS

Figure 1:
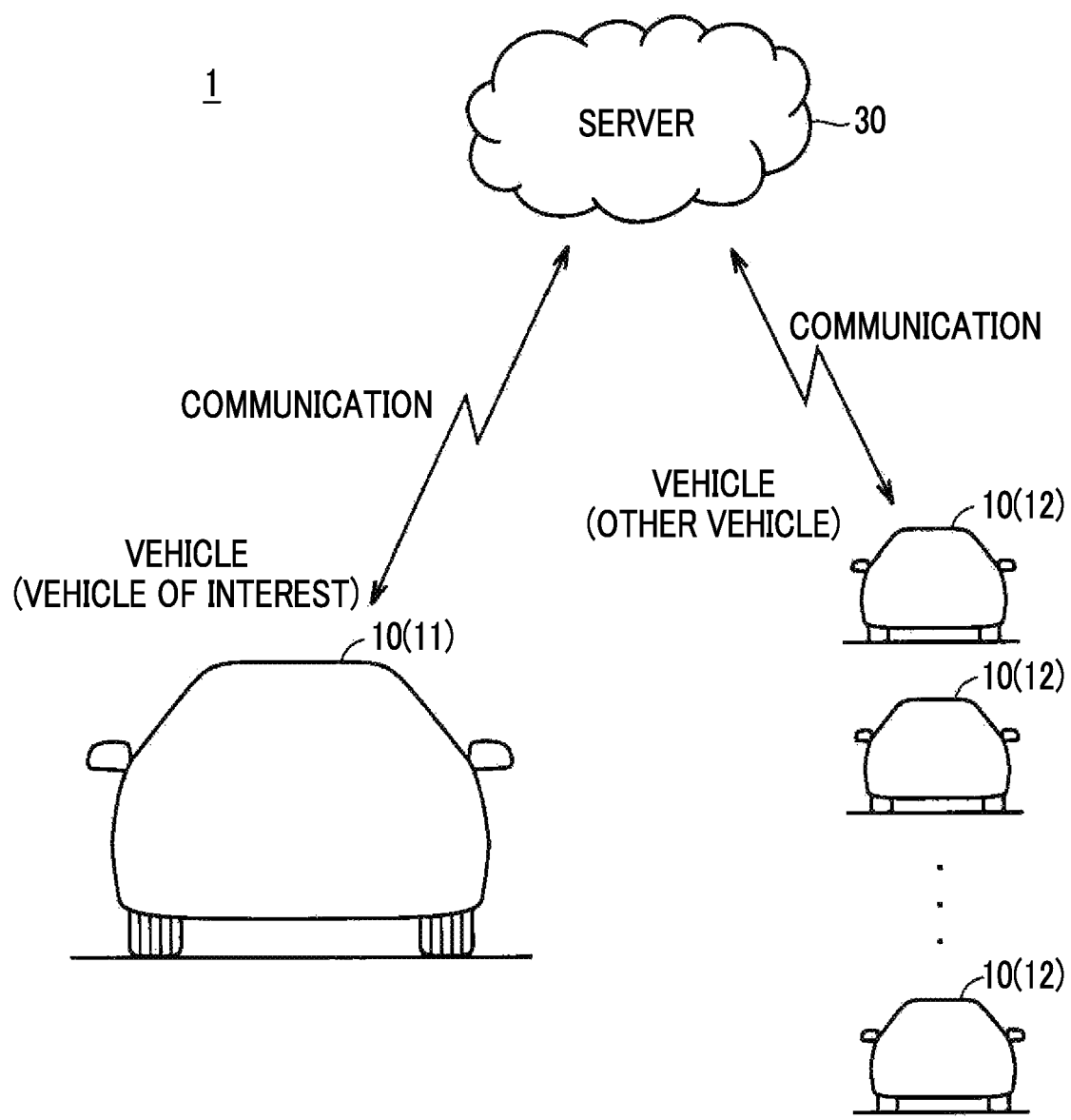
FIG. 1 is a diagram illustrating a configuration of a system to which a vehicle is applied according to a first embodiment.

Hereinafter, embodiments of the disclosure will be described in detail with reference to the accompanying drawings. In the drawings, identical or corresponding elements will be referenced by the same reference signs and description thereof will not be repeated.

First Embodiment

FIG. 1 is a diagram illustrating a configuration of a system 1 to which to a vehicle 10 is applied according to a first embodiment. Referring to FIG. 1, the system 1 includes a plurality of connected vehicles (hereinafter simply referred to as "vehicles") 10 and a server 30. In the first embodiment, the plurality of vehicles 10 are vehicles of the same model. Accordingly, specifications of the plurality of vehicles 10 are equivalent to each other.

The vehicles 10 are always connected to a network during operation of a vehicle system. The vehicles 10 are also electric vehicles (EV) including a motor as a driving force source.

The vehicles 10 are configured to transmit identifications (IDs) assigned to the vehicles 10 and result data indicating traveling results (for example, Global Positioning System (GPS) data and SOC data of a power storage device mounted in the vehicle) to the server 30 at predetermined intervals. The predetermined intervals are predetermined time intervals and are time intervals such as 15 seconds or 30 seconds. In the following description, for the purpose of convenience of explanation, one vehicle of the plurality of vehicles 10 is also referred to as a "vehicle of interest 11" and the vehicles 10 other than the vehicle of interest 11 are also referred to as "other vehicles 12."

The server 30 is configured to receive the IDs and the result data from the vehicles 10 at the predetermined intervals. Although details will be described later, a database that is used to manage rates of electric power consumption (Wh/km) of the vehicles 10 in regions is formed in the server 30 by collecting the result data of the vehicles 10. In the first embodiment, a traveling distance per Wh of electric power is referred to as an "electric power efficiency" (km/Wh) in consideration of a "fuel efficiency" (km/L) which is traveling distance per L of fuel, and the rate of electric power consumption is a reciprocal of the electric power efficiency. The rate of electric power consumption is an example of a rate of energy consumption.

In response to a request from the vehicles 10, data indicating the rate of electric power consumption calculated in the server 30 is transmitted from the server 30 to the vehicle 10. Although details will be described later, an EV travelable range is calculated in the vehicles 10 by using any one of data indicating the rate of electric power consumption calculated in the vehicle of interest and data indicating the rate of electric power consumption received from the server 30. The EV travelable range is a distance that a vehicle 10 can travel with a current residual amount of electric power in a power storage device which is mounted in the vehicle.

Figure 2:
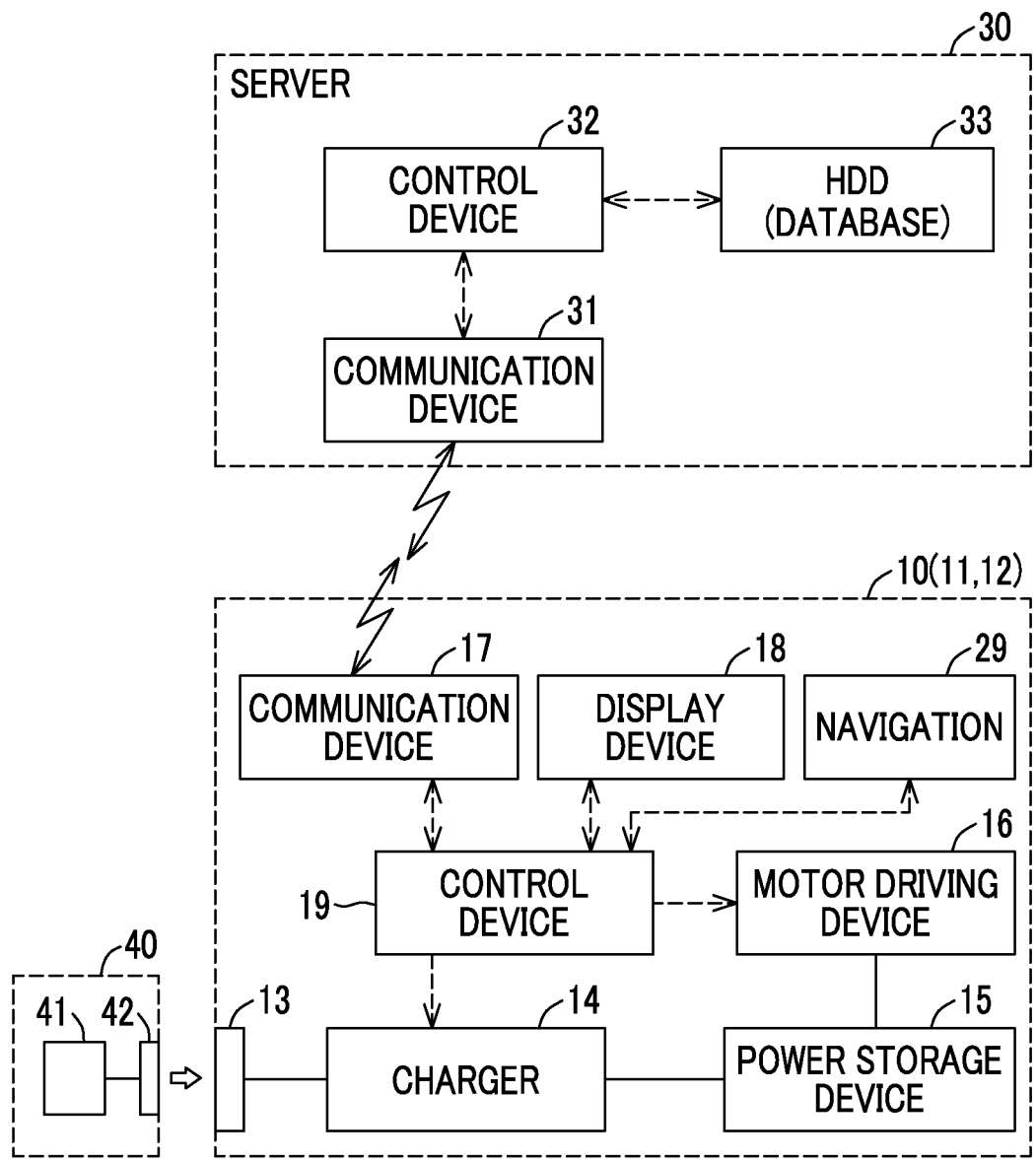
FIG. 2 is a diagram illustrating configurations of a vehicle and a server in more detail.

FIG. 2 is a diagram illustrating configurations of the vehicle 10 and the server 30 in more detail. Referring to FIG. 2, each vehicle 10 includes an inlet 13, a charger 14, a power storage device 15, a motor driving device 16, a communication device 17, a display device 18, a navigation device 29, and a control device 19. The server 30 includes a communication device 31, a control device 32, and a hard disk drive (HDD) 33.

First, the configuration of the server 30 will be described. The communication device 31 is configured to wirelessly communicate with the vehicle 10 (the communication device 17). The communication device 31 is connected to the control device 32 via a communication line and transmits information sent from the control device 32 to the vehicle 10 or sends information received from the vehicle 10 to the control device 32. As described above, for example, the communication device 31 receives the result data indicating traveling results (for example, GPS data and SOC data) and the IDs of the vehicles 10 from the vehicles 10 at predetermined intervals.

The control device 32 has a central processing unit (CPU) and a memory which are not illustrated therein and is configured to control the devices (such as the communication device 31 and the HDD 33) of the server 30 in accordance with a control program stored in the memory.

The HDD 33 is a storage device that stores a variety of data. The HDD 33 stores the result data (for example, GPS data and SOC data) received at predetermined intervals from the vehicles 10 in correlation with the IDs of the vehicles 10. The HDD 33 stores the above-mentioned database (a database that is used to manage the rates of electric power consumption of the vehicles 10 in regions).

Figure 3:
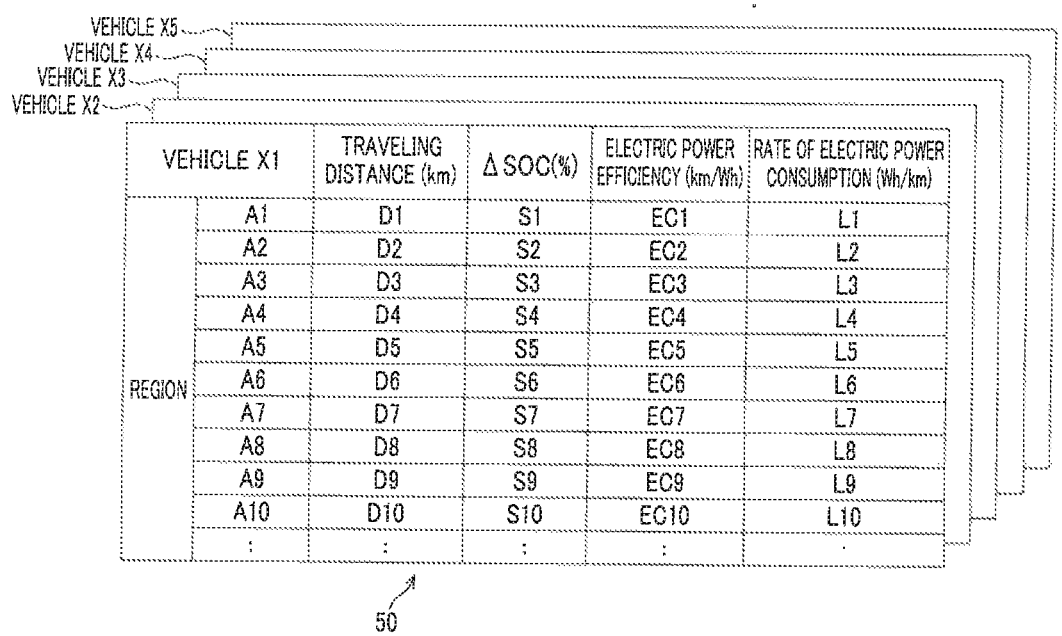
FIG. 3 is a diagram illustrating an example of a database which is stored in an HDD.

FIG. 3 is a diagram illustrating an example of the database which is stored in the HDD 33. Referring to FIG. 3, in a database 50, a traveling distance, ΔSOC (a change in SOC), an electric power efficiency, and a rate of electric power consumption in each region (for example, each of regions A1 to A10) of each vehicle 10 (for example, each of vehicles X1 to X5) are managed in correlation with each other. A boundary of a region and a region is defined in advance in the server 30 such that land areas having similar geographical features (regions having a similar rate of electric power consumption) constitute a series of regions. That is, a "region" refers to, for example, land areas having similar geographical features and thus does not need to indicate a wide area such as city, town, or village, but may indicate a narrow area such as an area with a radius of several tens of meters or several kilometers.

Figure 4:
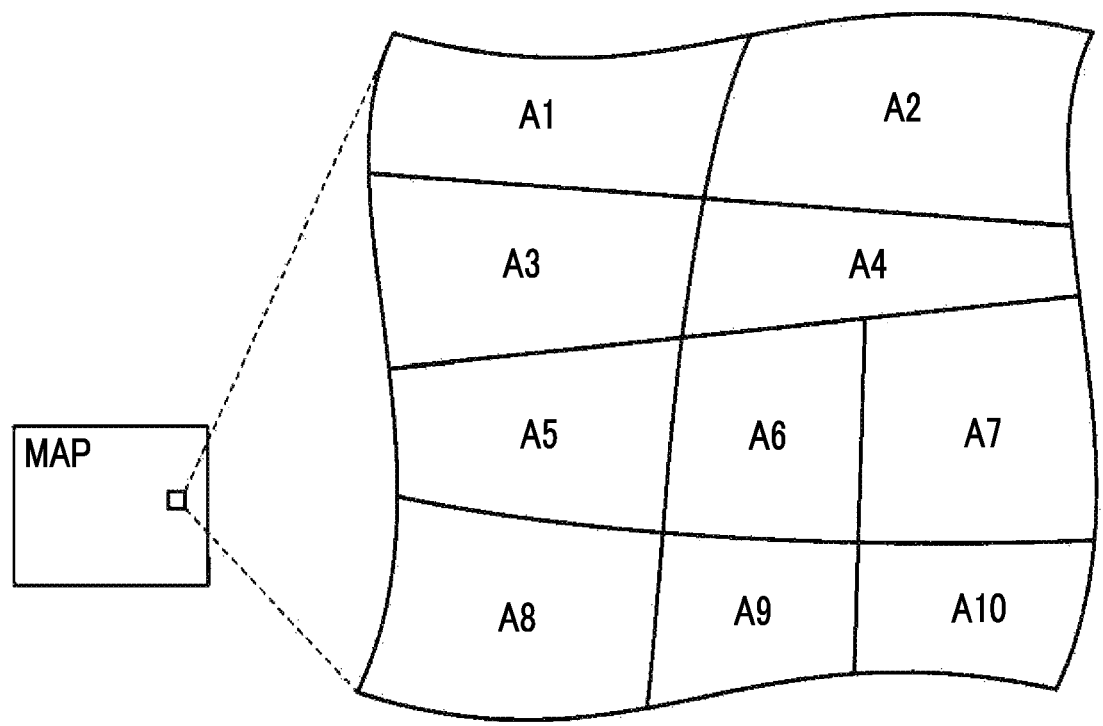
FIG. 4 is a diagram illustrating a method of generating a database.

FIG. 4 is a diagram illustrating a method of generating the database 50 (FIG. 3). Referring to FIG. 4, each region of Regions A1 to A10 is a region of which a boundary is defined in advance in the server 30.

The control device 32 calculates the traveling distance (km) and ΔSOC (%) in Vehicle X1 in Region A1 by accessing the HDD 33 and referring to the GPS data and the SOC data, for example, after Vehicle X1 (the vehicle 10) enters Region A1 and until the vehicle exits Region A1. The control device 32 calculates the electric power efficiency (km/Wh) of Vehicle X1 in Region A1 by dividing the calculated traveling distance by an amount of electric power corresponding to the calculated ΔSOC, and calculates the rate of electric power consumption (Wh/km) by taking a reciprocal of the electric power efficiency. The control device 32 calculates the traveling distances, the ΔSOC, the electric power efficiencies, and the rates of electric power consumption of the vehicles 10 in the regions in the same way. Accordingly, the database 50 (FIG. 3) is generated.

Referring to FIG. 2 again, the configuration of the vehicle 10 will be described below. The inlet 13 is configured to be connected to a connector 42 of a power supply facility 41 which is disposed in a charging stand 40. The charger 14 is disposed between the inlet 13 and the power storage device 15, converts electric power input from the charging stand 40 into electric power with which the power storage device 15 can be charged, and outputs the converted electric power to the power storage device 15.

The power storage device 15 is a power storage element configured to be chargeable and dischargeable. The power storage device 15 includes a power storage element of a secondary battery such as a lithium-ion battery, a nickel-hydride battery, or a lead storage battery, an electric double layer capacitor, or the like.

The motor driving device 16 generates a vehicle driving force using electric power supplied from the power storage device 15. The motor driving device 16 includes a motor generator that is mechanically connected to driving wheels and a power control unit (such as an inverter) that controls an amount of current flowing into the motor generator. The output of the motor driving device 16 (the amount of current flowing in the motor generator) is controlled in accordance with a control signal from the control device 19. The number of motor generators included in the motor driving device 16 may be one or two or more.

The communication device 17 is configured to wirelessly communicate with the server 30 (the communication device 31). The communication device 17 is connected to the control device 19 via a communication line and transmits information sent from the control device 19 to the server 30 or sends information received from the server 30 to the control device 19. As described above, the communication device 17 transmits the result data and the IDs of the vehicles 10 to the server 30 at predetermined intervals.

The display device 18 is a display device configured to display information for supporting driving of the vehicle 10. The display device 18 displays, for example, the above-mentioned EV travelable range.

Figure 5:
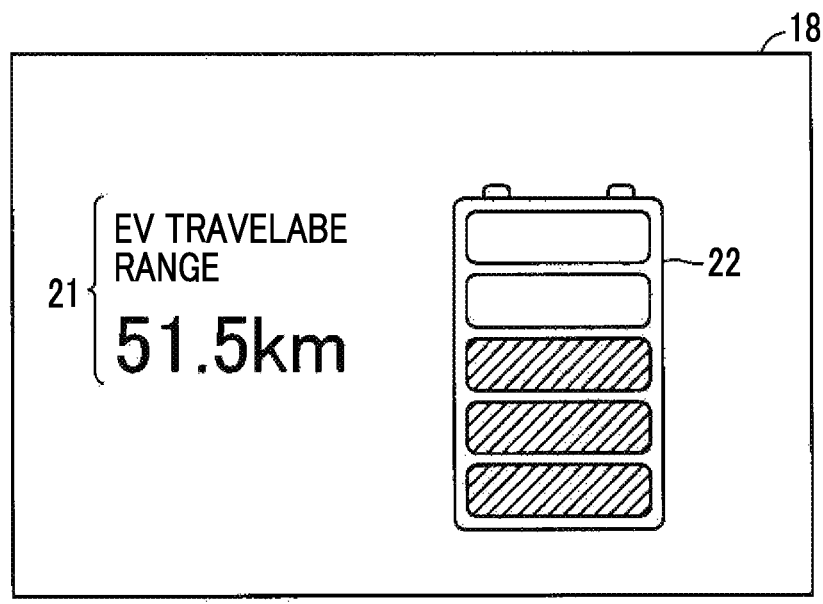
FIG. 5 is a diagram illustrating an example of an image which is displayed by a display device.

FIG. 5 is a diagram illustrating an example of an image which is displayed by the display device 18. Referring to FIG. 5, the display device 18 displays, for example, images 21 and 22. The image 21 is an image indicating the EV travelable range. The image 22 is an image schematically illustrating a residual amount of electric power of the power storage device 15. A user can recognize the residual amount of electric power of the power storage device 15 and the EV travelable range by viewing the display device 18.

Referring to FIG. 2 again, the navigation device 29 is a device for guiding a user through a route to a destination. The navigation device 29 stores, for example, map information in an internal memory (not illustrated). The navigation device 29 displays a current location of the vehicle 10 on a map by using information indicating the current location of the vehicle 10, which is acquired using the GPS, and the map information.

The control device 19 has a CPU and a memory, which are not illustrated, built therein and controls the devices (such as the charger 14, the motor driving device 16, the communication device 17, the display device 18, and the navigation device 29) of the vehicle 10 based on information stored in the memory and information from various sensors.

The control device 19 is configured to calculate a state of charge (SOC) of the power storage device 15, for example, using an integrated value of an output of a current sensor (not illustrated) that detects a current of the power storage device 15.

The control device 19 is configured, for example, to calculate a rate of electric power consumption (hereinafter also referred to as a "first rate of electric power consumption") based on traveling results of the vehicle of interest. An example of the method of calculating the first rate of electric power consumption will be described below. The control device 19 detects the traveling distance at predetermined time intervals and a change in SOC ($\Delta$SOC) of the power storage device 15, for example, during traveling of the vehicle of interest. The control device 19 periodically calculates the electric power efficiency (km/Wh) by dividing the traveling distance by an amount of electric power corresponding to the $\Delta$SOC, and calculates the rate of electric power consumption (Wh/km) by taking a reciprocal of the electric power efficiency. The control device 19 calculates the first rate of electric power consumption by taking a moving average of the calculated rates of electric power consumption. The calculated first rate of electric power consumption is sequentially updated, for example, in an internal memory of the control device 19.

As described above, the display device 18 displays the EV travelable range (FIG. 5). The EV travelable range is calculated by dividing the residual amount (Wh) of electric power of the power storage device 15 by the rate of electric power consumption (Wh/km) (that is, the rate of electric power consumption can be said to be data having a correlation with the EV travelable range). Accordingly, when the rate of electric power consumption used to calculate the EV travelable range is greatly separated from the actual rate of electric power consumption, a difference between the calculated EV travelable range and the actual EV travelable range increases.

A case in which the EV travelable range is calculated using only the first rate of electric power consumption will be considered. The first rate of electric power consumption is calculated by taking a moving average of the rates of electric power consumption which are periodically calculated in the vehicle of interest 11 as described above. Accordingly, when the actual rate of electric power consumption changes rapidly, the first rate of electric power consumption cannot satisfactorily follow the actual rate of electric power consumption.

For example, when a traveling region of the vehicle 10 is changed from a level road to a mountain road or when the traveling region of the vehicle 10 is changed from downtown to an expressway, the rate of electric power consumption of the vehicle 10 increases greatly. In this case, since the first rate of electric power consumption cannot satisfactorily follow the increase in the actual rate of electric power consumption, the first rate of electric power consumption may be less than the actual rate of electric power consumption. In this case, the EV travelable range displayed on the display device 18 is longer than the actual EV travelable range. As a result, a user may drive the vehicle 10 believing in the EV travelable range displayed on the display device 18, but the vehicle 10 may not travel actually such a long distance.

Therefore, in the vehicle 10 according to the first embodiment, the control device 19 calculates the EV travelable range of the vehicle 10 based on the greater rate of electric power consumption (data in which the EV travelable range is shorter) among the first rate of electric power consumption (first data having a correlation with the EV travelable range) which is calculated based on the traveling results of the vehicle 10 and the second rate of electric power consumption (second data having a correlation with the EV travelable range) which is calculated based on the result data collected in the server 30.

An example of the method of calculating the second rate of electric power consumption will be described below. First, the vehicle of interest 11 transmits data (GPS data) indicating a current traveling region to the server 30. The control device 32 of the server 30 retrieves the rates of electric power consumption of other vehicles 12 correlated with the current traveling region of the vehicle of interest 11 from the database 50 (FIG. 3). When the rates of electric power consumption of a plurality of other vehicles 12 are found, the control device 32 calculates the second rate of electric power consumption by taking an average of the found plurality of rates of electric power consumption. The control device 32 controls the communication device 31 such that it transmits the calculated second rate of electric power consumption to the vehicle of interest 11. Accordingly, the vehicle of interest 11 can receive the second rate of electric power consumption.

Since the second rate of electric power consumption is calculated based on the result values of the rates of electric power consumption of the other vehicles 12 in the current traveling region of the vehicle of interest 11, there is a likelihood that the second rate of electric power consumption will be closer to the actual rate of electric power consumption than the first rate of electric power consumption. On the other hand, since a driving practice of a user of the vehicle of interest 11 is not reflected in the second rate of electric power consumption, there may be a likelihood that the first rate of electric power consumption will be close to the actual rate of electric power consumption when the driving practice of the user of the vehicle of interest 11 is very different from the driving practices of users of the other vehicles 12.

As described above, in the first embodiment, for the purpose of safety, the EV travelable range is calculated based on the greater rate of electric power consumption of the first and second rates of electric power consumption. Accordingly, for example, when the second rate of electric power consumption is greater than the first rate of electric power consumption, a shorter EV travelable range is calculated than when the EV travelable range is calculated using only the first rate of electric power consumption. As a result, in the vehicle 10, it is possible to reduce a likelihood that the actual EV travelable range will be shorter than the calculated EV travelable range.

Figure 6:
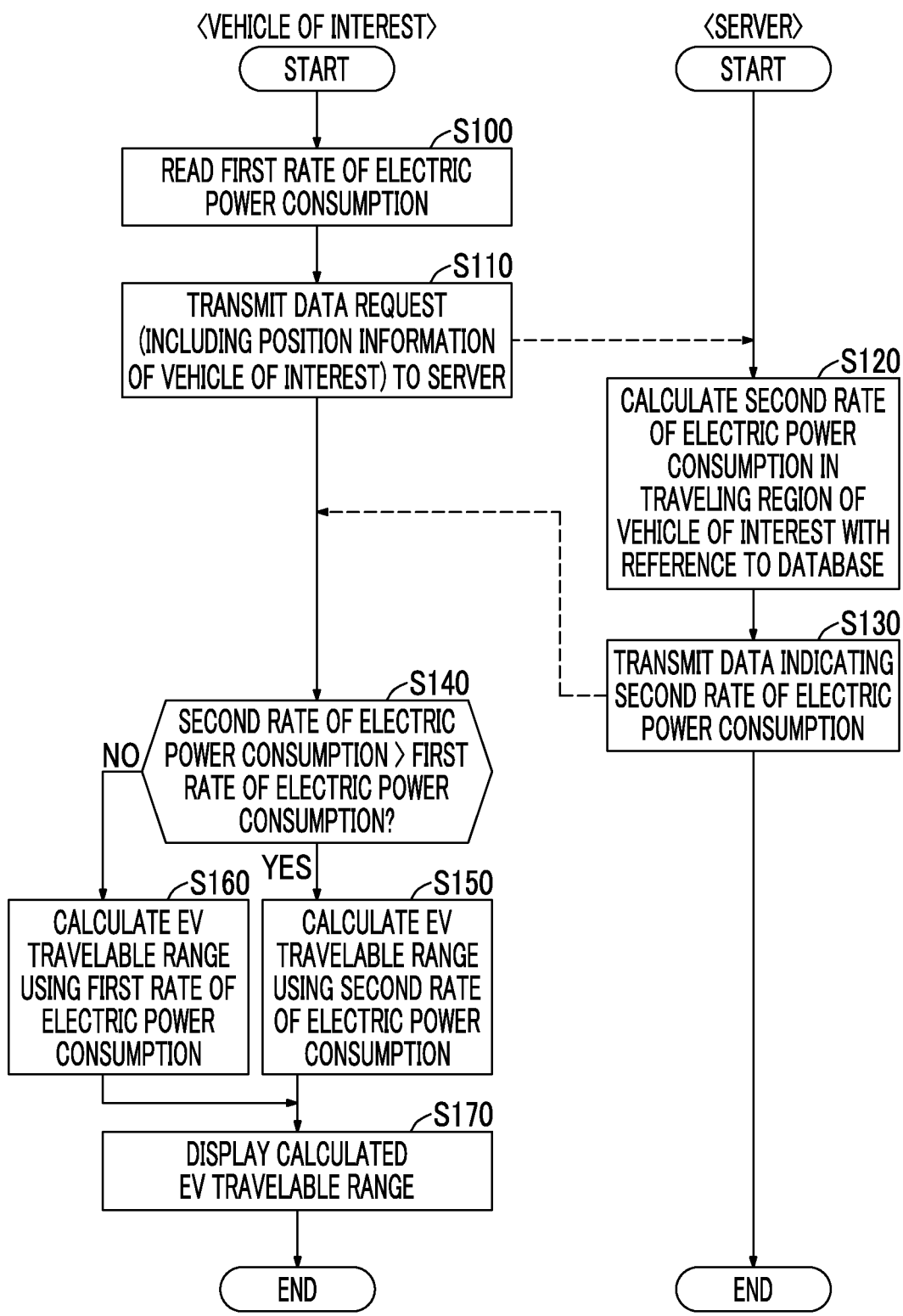
FIG. 6 is a flowchart illustrating routines which are performed in a vehicle of interest and a server to display an EV travelable range on the display device.

FIG. 6 is a flowchart illustrating routines which are performed by the vehicle of interest 11 and the server 30 to display the EV travelable range on the display device 18. The routine illustrated in the left flowchart is performed by the vehicle of interest 11. The routine illustrated in the right flowchart is performed by the server 30. The routines illustrated in the flowcharts are periodically performed, for example, during operation of the control devices 19 and 32.

Referring to FIG. 6, the control device 19 reads the first rate of electric power consumption which is calculated based on the traveling results (the traveling distance and the $\Delta$SOC) of the vehicle of interest 11 from the internal memory of the control device 19 (Step S100). The control device 19 acquires GPS data from the navigation device 29 and controls the communication device 17 such that it transmits the acquired GPS data and a data request for the second rate of electric power consumption to the server 30 (Step S110).

When the server 30 receives the data request from the vehicle of interest 11 via the communication device 31, the control device 32 calculates the second rate of electric power consumption in the traveling region of the vehicle of interest 11 (a region including a position indicated by the received GPS data) with reference to the database 50 (FIG. 3) (Step S120). The control device 32 controls the communication device 31 such that it transmits the calculated second rate of electric power consumption to the vehicle of interest 11 (Step S130).

After the data request is transmitted to the server 30 in Step S110, the control device 19 monitors whether data indicating the second rate of electric power consumption is received from the server 30. When it is confirmed that data indicating the second rate of electric power consumption is received from the server 30, the control device 19 determines whether the second rate of electric power consumption is greater than the first rate of electric power consumption (which is read in Step S100) (Step S140).

When it is determined that the second rate of electric power consumption is greater than the first rate of electric power consumption (YES in Step S140), the control device 19 calculates the EV travelable range using the second rate of electric power consumption (and the residual amount of electric power of the power storage device 15) (Step S150). On the other hand, when it is determined that the second rate of electric power consumption is equal to or less than the first rate of electric power consumption (NO in Step S140), the control device 19 calculates the EV travelable range using the first rate of electric power consumption (and the residual amount of electric power of the power storage device 15) (Step S160). Thereafter, the control device 19 controls the display device 18 such that it displays the calculated EV travelable range (Step S170).

As described above, in the vehicle 10 according to the first embodiment, the control device 19 calculates the EV travelable range of the vehicle 10 based on the greater rate of electric power consumption of the first rate of electric power consumption which is calculated based on the traveling results of the vehicle 10 and the second rate of electric power consumption which is calculated based on the result data collected in the server 30. Accordingly, according to this vehicle 10, it is possible to reduce a likelihood that the actual EV travelable range will be shorter than the calculated EV travelable range.

In the vehicle 10 according to the first embodiment, the second rate of electric power consumption is calculated by the server 30. Accordingly, according to the vehicle 10, since the second rate of electric power consumption does not need to be calculated by the vehicle of interest 11, it is possible to calculate the EV travelable range with a calculation load less than that when the second rate of electric power consumption is calculated by the vehicle of interest 11.

Modified Example

In the first embodiment, the second rate of electric power consumption is calculated by the server 30. In a modified example of the first embodiment, the second rate of electric power consumption is calculated by the vehicle of interest 11 based on the result data (for example, the traveling distances and the ΔSOC) of the other vehicle 12 received from the server 30.

Figure 7:
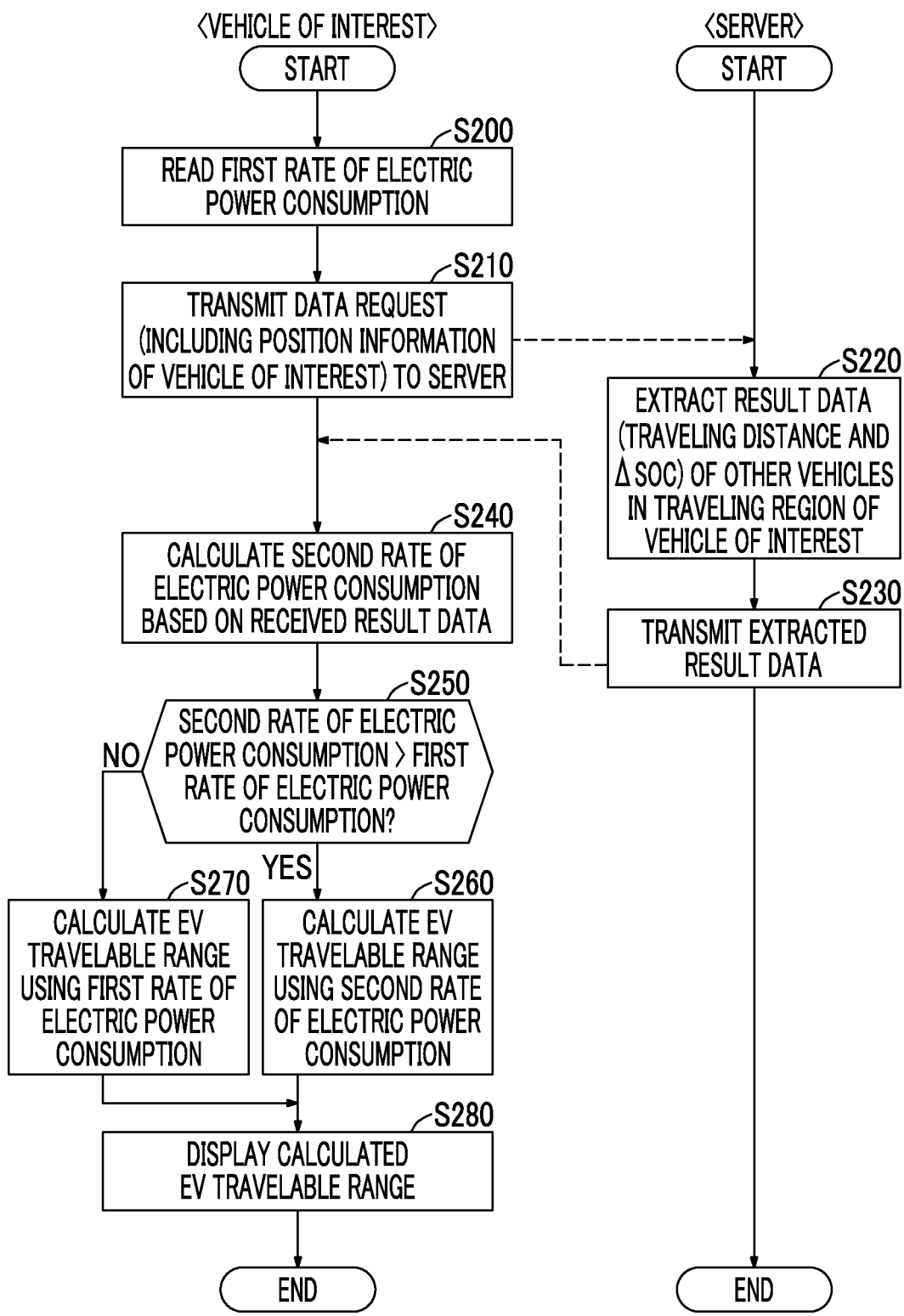
FIG. 7 is a flowchart illustrating routines which are performed in a vehicle of interest and a server to display an EV travelable range on a display device in a modified example of the first embodiment.

FIG. 7 is a flowchart illustrating routines which are performed by the vehicle of interest 11 and the server 30 to display the EV travelable range on the display device 18 in a modified example of the first embodiment. The routine illustrated in the left flowchart is performed by the vehicle of interest 11. The routine illustrated in the right flowchart is performed by the server 30. The routines illustrated in the flowcharts are periodically performed, for example, during operation of the control devices 19 and 32. Steps S200 and S210 and Steps S250 to S280 are the same as Steps S100 and S110 and Steps S140 to S170 in FIG. 6 and thus description thereof will not be repeated.

Referring to FIG. 7, when the server 30 receives the data request from the vehicle of interest 11 via the communication device 31, the control device 32 extracts the result data (such as the traveling distances and ΔSOC) of the other vehicles 12 in the traveling region in which the vehicle of interest 11 travels (a region including a position indicated by the received GPS data) with reference to the database 50 (FIG. 3) (Step S220). For example, when there are a plurality of pieces of result data of the other vehicles 12 in the traveling region of the vehicle of interest 11 in the database 50, a plurality of pieces of result data are extracted. The control device 32 controls the communication device 31 such that it transmits the extracted result data to the vehicle of interest 11 (Step S230).

After the data request is transmitted to the server 30 in Step S210, the control device 19 monitors whether the result data is received from the server 30. When it is confirmed that the result data is received from the server 30, the control device 19 calculates the second rate of electric power consumption based on the received result data (the traveling distance and the ΔSOC) (Step S240). For example, when there is a plurality of pieces of result data, the second rate of electric power consumption is calculated by calculating the rates of electric power consumption from pairs of the traveling distance and the ΔSOC and taking an average of the calculated plurality of rates of electric power consumption.

As described above, in the vehicle 10 according to the modified example of the first embodiment, the communication device 17 is configured to receive the result data from the server 30, and the control device 19 is configured to calculate the second rate of electric power consumption based on the received result data. Accordingly, according to the vehicle 10, it is possible to change an algorithm for calculating the second rate of electric power consumption by only updating a control program in the vehicle of interest 11, for example, when it is necessary to improve the control program for calculating the second data.

Second Embodiment

Since the vehicle 10 according to the first embodiment has been assumed to be an electric vehicle (EV), only the method of calculating the EV travelable range has been described above regarding the travelable range of the vehicle 10. Vehicles 10A (a vehicle of interest 11A and other vehicles 12A) according to a second embodiment are so-called plug-in hybrid vehicles (PHVs). Accordingly, in the vehicles 10A, an HV travelable range is calculated in addition to the EV travelable range. The HV travelable range is a distance that the vehicle 10A can travel with a current residual amount of fuel (such as gasoline or light oil).

Figure 8:
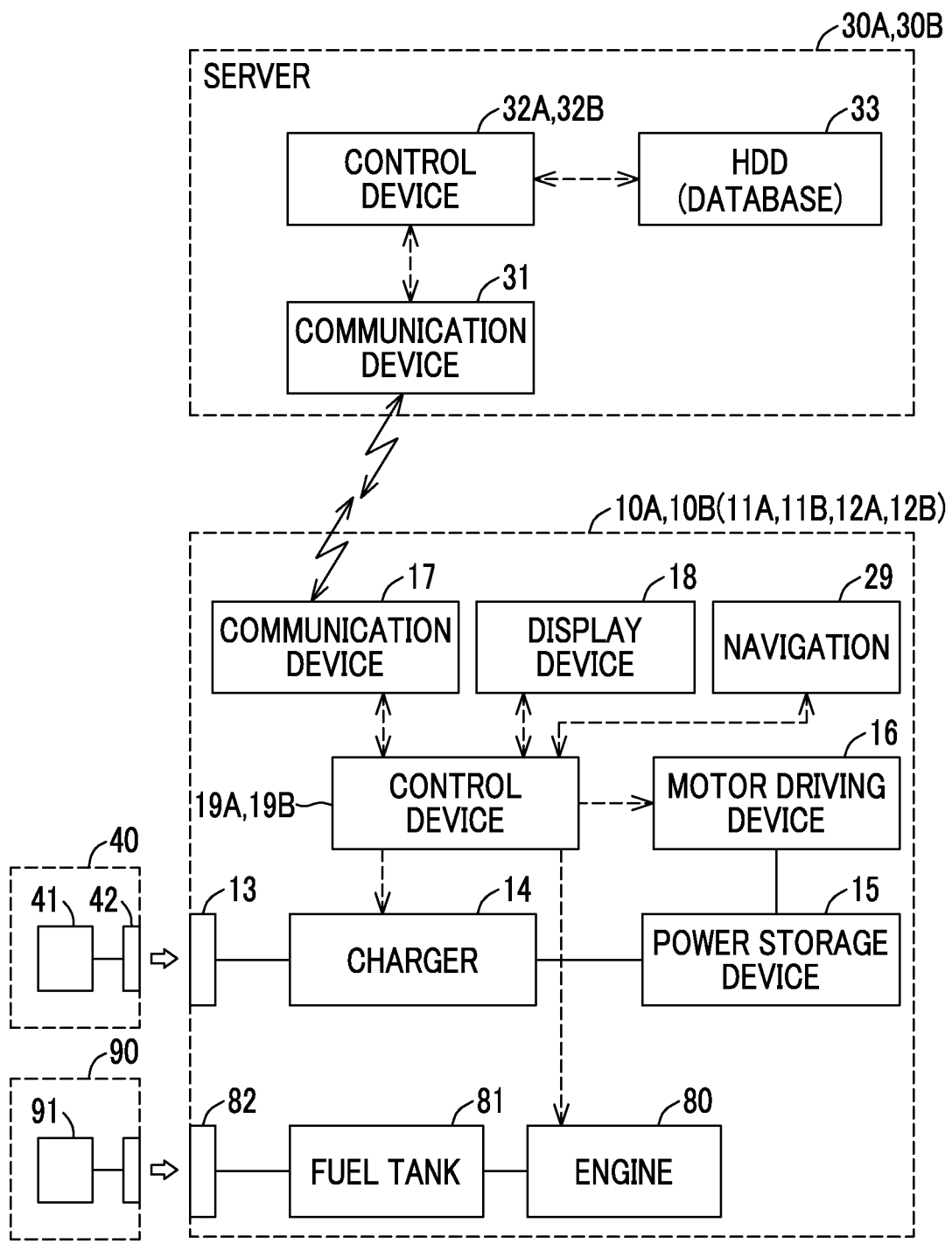
FIG. 8 is a diagram illustrating configurations of a vehicle and a server according to a second embodiment in more detail.

FIG. 8 is a diagram illustrating configurations of a vehicle 10A and a server 30A according to the second embodiment in detail. The same elements as in the first embodiment will not be repeatedly described.

First, the configuration of the vehicle 10A will be described with reference to FIG. 8. The vehicle 10A includes an engine 80, a fuel tank 81, an oil supply port 82, and a control device 19A. The oil supply port 82 is configured to be connected to an oil supply facility 91 of a gas station 90.

The fuel tank 81 stores fuel (such as gasoline or light oil) supplied from the oil supply port 82. The engine 80 generates power using the fuel supplied from the fuel tank 81. The output of the engine 80 is controlled by a control signal from the control device 19A. In the second embodiment, the engine 80 is used for both of electric power generation and wheel driving. The disclosure is not limited to such an example, but the engine 80 may be used for electric power generation or for wheel driving.

The vehicle 10A performs electric-vehicle traveling (hereinafter also referred to as "EV traveling") in which the engine 80 is stopped and the motor driving device 16 is used until the SOC of the power storage device 15 is equal to or less than a predetermined value, and to perform hybrid-vehicle traveling (hereinafter also referred to as "HV traveling") in which the engine 80 is activated and both the engine 80 and the motor driving device 16 are used after the SOC of the power storage device 15 is equal to or less than the predetermined value.

The control device 19A has a CPU and a memory, which are not illustrated, built therein and controls the devices (such as the charger 14, the motor driving device 16, the communication device 17, the display device 18, the navigation device 29, and the engine 80) of the vehicle 10A based on information stored in the memory and information from various sensors.

The control device 19A is configured to calculate the SOC of the power storage device 15, for example, using an integrated value of an output of a current sensor (not illustrated) that detects a current of the power storage device 15. The control device 19A is configured to detect a residual amount of fuel, for example, by receiving an output of a fuel sensor (not illustrated) disposed in the fuel tank 81.

The control device 19A is configured to set a control mode of the vehicle 10A to any one of a charge depleting (CD) mode and a charge sustaining (CS) mode. The CD mode is a mode which is set until the SOC of the power storage device 15 is equal to or less than a predetermined value, and the CS mode is a mode which is set after the SOC of the power storage device 15 is equal to or less than the predetermined value.

Figure 9:
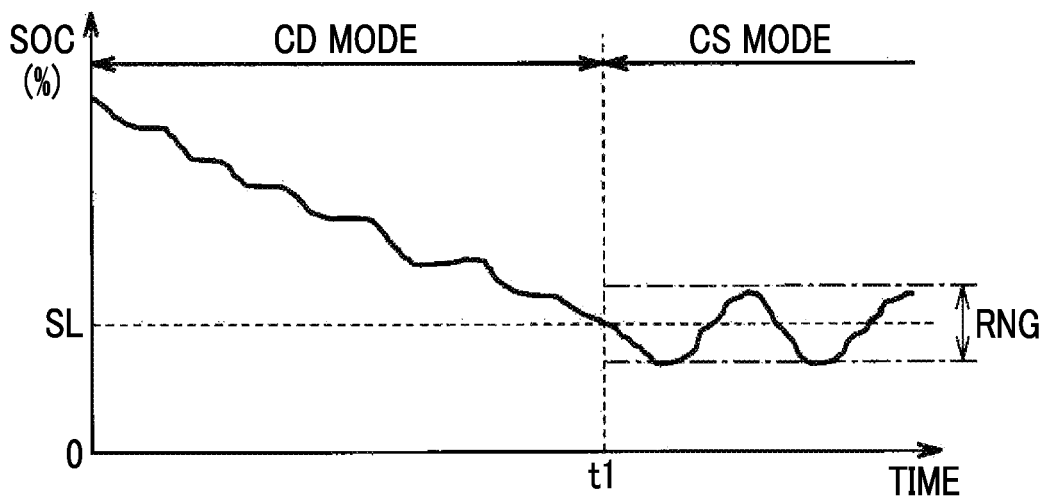
FIG. 9 is a diagram illustrating a CD mode and a CS mode.

FIG. 9 is a diagram illustrating the CD mode and the CS mode. Referring to FIG. 9, for example, it is assumed that the vehicle starts traveling in the CD mode after the power storage device 15 is fully charged with electric power supplied from the charging stand 40.

The CD mode is a mode in which the SOC is consumed, and is basically a mode in which electric power stored in the power storage device 15 is consumed. During traveling in the CD mode, the engine 80 is not activated to sustain the SOC. The SOC may increase temporarily by regenerative electric power which is recovered at the time of deceleration of the vehicle or electric power which is generated by activation of the engine 80, but a ratio of discharging to charging increases conclusively and the SOC decreases as a whole. Since the EV traveling is not always performed in the CD mode, but the ratio of the EV traveling is basically large, the EV travelable range refers to a travelable distance in the CD mode in the second embodiment.

The CS mode is a mode in which the SOC is sustained at a predetermined level. For example, when the SOC decreases to a predetermined value SL indicating a decrease in SOC at time t1, the SOC is then maintained in a control range RNG which is determined based on the predetermined value SL. Specifically, the SOC is controlled in the control range RNG by allowing the engine 80 to appropriately repeatedly operate and stop (intermittent driving). In this way, in the CS mode, the engine 80 operates to sustaining the SOC. Since the HV traveling is not always performed in the CS mode, but traveling is basically performed using energy which is generated based on fuel, the HV travelable range in the second embodiment refers to a travelable range in the CS mode.

In the CD mode, when a large vehicle driving force (required power) is required, the engine 80 is activated. On the other hand, in the CS mode, when the SOC increases, the engine 80 stops. That is, as described above, the CD mode is not limited to the EV traveling in which the engine 80 always stops to travel, and the CS mode Is not limited to the HV traveling in which the engine 80 always operates to travel. In the CD mode and the CS mode, the EV traveling and the HV traveling are possible.

Referring to FIG. 8 again, in the second embodiment, a rate of energy consumption of the vehicle 10A is expressed using two items of a "rate of electric power consumption" which is an amount of electric power required for the vehicle 10A to travel 1 km and a "rate of fuel consumption" which is an amount of fuel required for the vehicle 10A to travel 1 km.

The control device 19A is configured to calculate both a first rate of electric power consumption in the CD mode and a first rate of fuel consumption in the CS mode. The calculated first rate of electric power consumption and the calculated first rate of fuel consumption are sequentially updated in the internal memory of the control device 19.

First, an example of the method of calculating the first rate of electric power consumption in the CD mode will be described below. For example, when the CD mode is set, the control device 19A periodically calculates the change in SOC ($\Delta$SOC) of the power storage device 15 and the traveling distance. Periodically, the control device 19A calculates an electric power efficiency by dividing the traveling distance by the amount of electric power corresponding to the $\Delta$SOC and calculates the rate of electric power consumption by taking a reciprocal of the electric power efficiency. The control device 19A calculates the first rate of electric power consumption by taking a moving average of the calculated rates of electric power consumption. When the CS mode is set, the newest first rate of electric power consumption stored in the internal memory of the control device 19A is used as the first rate of electric power consumption.

An example of the method of calculating the first rate of fuel consumption in the CS mode will be described below. For example, when the CS mode is set, the control device 19A periodically calculates a change in a residual amount of fuel (hereinafter also referred to as "$\Delta$F") in the fuel tank 81 with respect to a predetermined traveling distance. The control device 19A calculates a fuel efficiency by dividing the traveling distance by the $\Delta$F and calculates the rate of fuel consumption by taking a reciprocal of the fuel efficiency. The control device 19A calculates the first rate of fuel consumption by taking a moving average of the calculated rates of fuel consumption. When the CD mode is set by the control device 19A, the newest first rate of fuel consumption stored in the internal memory of the control device 19A is used as the first rate of fuel consumption.

The control device 19A controls the display device 18 such that it displays an image different from in the first embodiment to support driving of the vehicle 10A.

Figure 10:
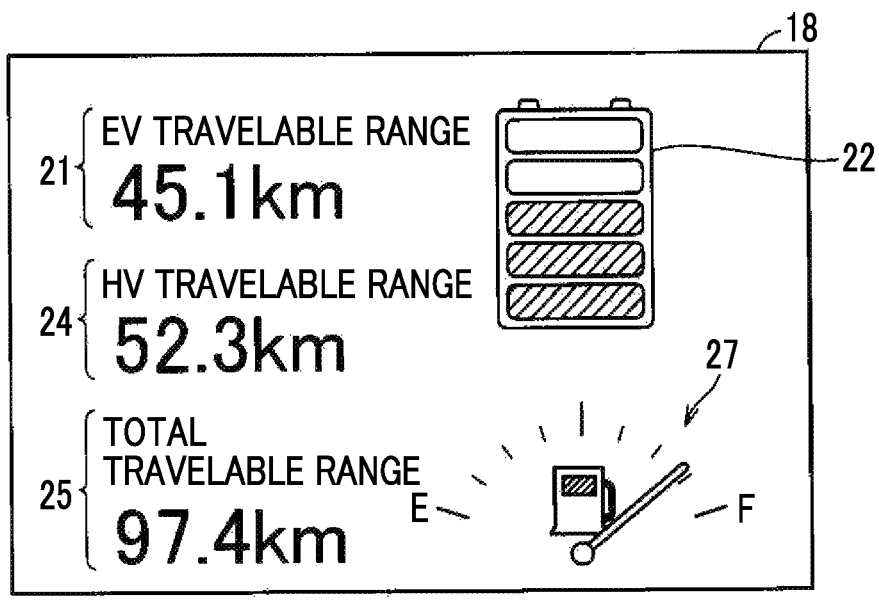
FIG. 10 is a diagram illustrating an example of an image which is displayed by a display device.

FIG. 10 is a diagram illustrating an example of an image which is displayed by the display device 18 in the second embodiment. Referring to FIG. 10, the control device 19A controls the display device 18, for example, such that it displays images 24, 25, and 27 in addition to the images 21 and 22 displayed on the display device 18 in the first embodiment. The image 24 is an image indicating the HV travelable range. The image 25 is an image indicating a sum of the EV travelable range and the HV travelable range. The EV travelable range is calculated by dividing the current residual amount of electric power in the power storage device 15 by the rate of electric power consumption (Wh/km). The HV travelable range calculates by dividing the current residual amount of fuel in the fuel tank 81 by the rate of fuel consumption (L/km). The image 27 is an image indicating a residual amount of fuel in the fuel tank 81.

The configuration of the server 30A will be described below with reference to FIG. 8 again. The server 30A includes a communication device 31, a control device 32A, and an HDD 33.

The communication device 31 receives, for example, result data (for example, GPS data, SOC data, and residual fuel amount data) indicating traveling results of the vehicle 10A, data indicating the mode of the vehicle 10A (the CD mode or the CS mode), and an ID of the vehicle 10A from each vehicle 10A at predetermined intervals.

The control device 32A has a CPU and a memory, which are not illustrated, built therein and is configured to control the devices (such as the communication device 31 and the HDD 33) of the server 30A in accordance with a control program stored in the memory.

The HDD 33 stores the result data (for example, GPS data, SOC data, and residual fuel amount data) received from the vehicle 10A at predetermined intervals in correlation with the ID and the mode (the CD mode of the CS mode) of the corresponding vehicles 10A. The HDD 33 stores a database which is used to manage the rate of electric power consumption of each vehicle 10A in the CD mode in each region and a database which is used to manage to the rate of fuel consumption of the vehicle 10A in the CS mode in each region.

Figure 11:
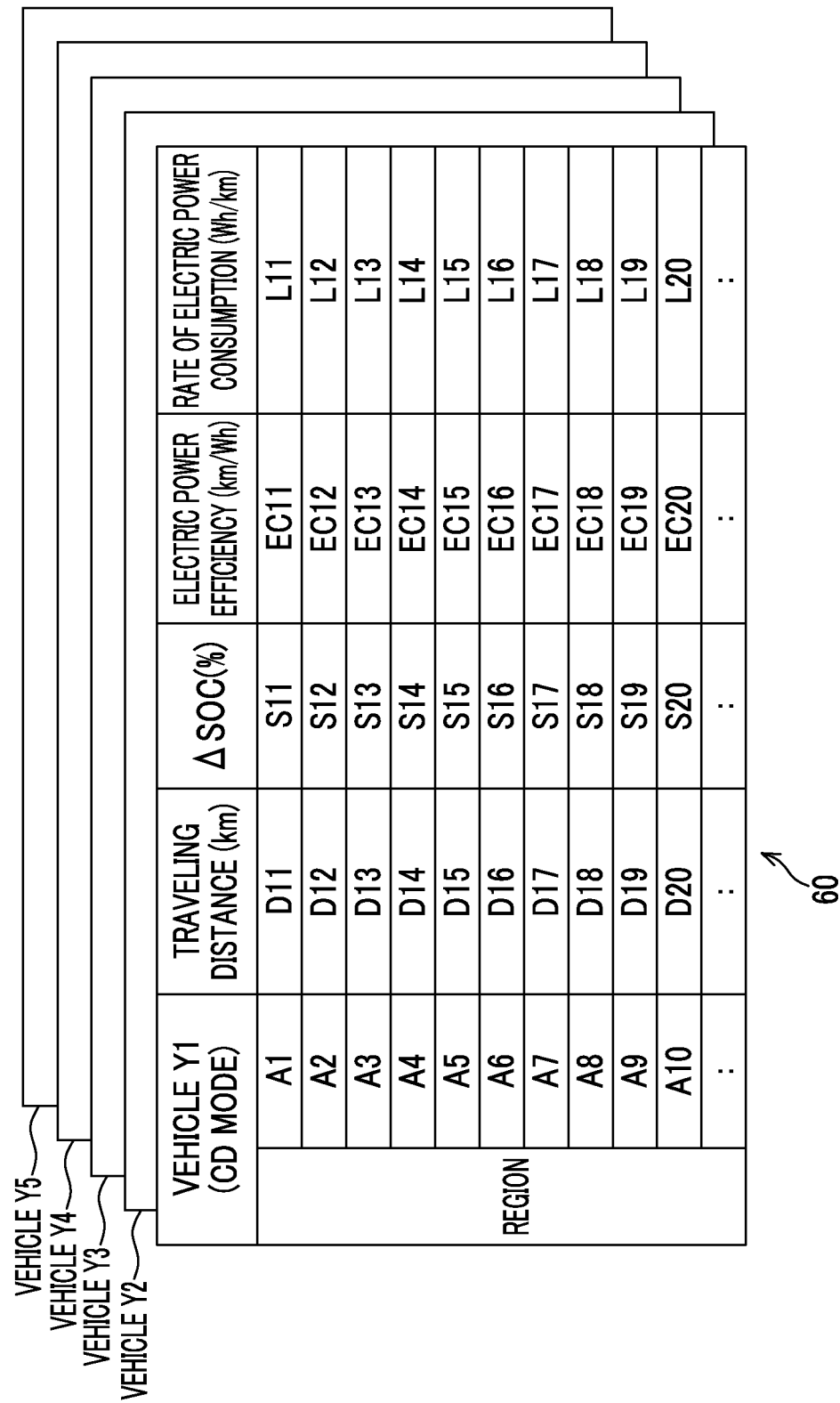
FIG. 11 is a diagram illustrating an example of a database that is used to manage rates of electric power consumption of vehicles in the CD mode.

FIG. 11 is a diagram illustrating an example of the database which is used to manage the rate of electric power consumption of each vehicle 10A in the CD mode. Referring to FIG. 11, the traveling distance, the $\Delta$SOC, the electric power efficiency, and the rate of electric power consumption in reach region (for example, Regions A1 to A10) of each vehicle 10A (for example, each of Vehicles Y1 to Y5) in the CD mode are managed in correlation with each other in a database 60.

A method of generating the database 60 will be described below. The control device 32A calculates the traveling distance and the $\Delta$SOC of Vehicle Y1 in Region A1 by accessing the HDD 33 and referring to the GPS data and the SOC data, for example, after Vehicle Y1 (the vehicle 10A) in the CD mode enters Region A1 and until the vehicle exits from Region A1 or until the mode is switched to the CS mode. The control device 32A calculates the electric power efficiency of Vehicle Y1 in Region A1 by dividing the calculated traveling distance by an amount of electric power corresponding to the calculated $\Delta$SOC, and calculates the rate of electric power consumption (Wh/km) by taking a reciprocal of the electric power efficiency. The control device 32A calculates the traveling distance, the $\Delta$SOC, the electric power efficiency, and the rate of electric power consumption of the vehicles 10A in the CD mode in each region in the same way. Accordingly, the database 60 is generated.

Figure 12:
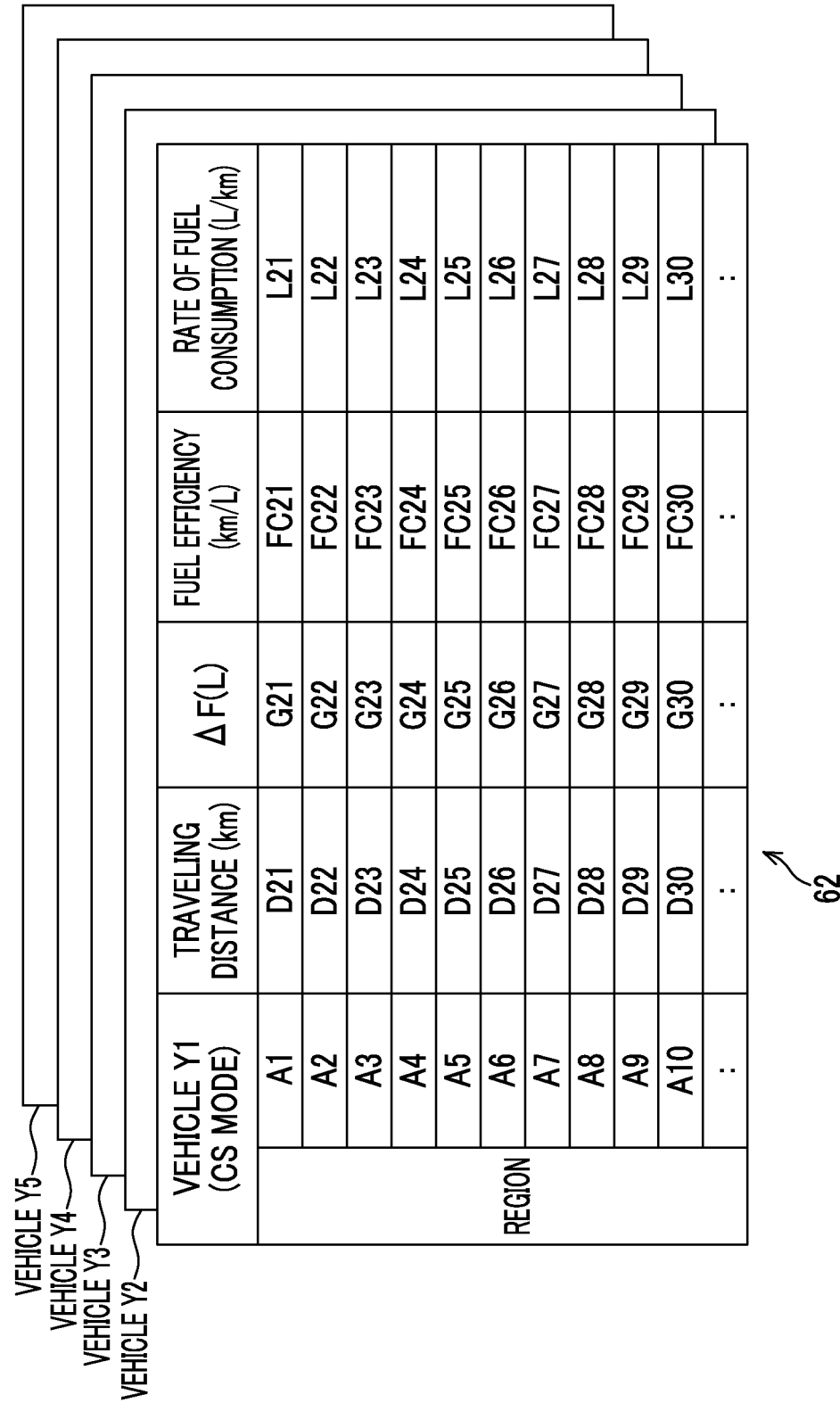
FIG. 12 is a diagram illustrating an example of a database that is used to manage rates of fuel consumption of vehicles in the CS mode.

FIG. 12 is a diagram illustrating an example of the database which is used to manage the rate of fuel consumption of each vehicle 10A in the CS mode. Referring to FIG. 12, the traveling distance, the $\Delta$F (a change in a residual amount of fuel), the fuel efficiency, and the rate of fuel consumption (L/km) in reach region of each vehicle 10A in the CS mode are managed in correlation with each other in a database 62.

A method of generating the database 62 will be described below. The control device 32A calculates the traveling distance and the $\Delta$F of Vehicle Y1 in Region A1by accessing the HDD 33 and referring to the GPS data and the residual fuel amount data, for example, after Vehicle Y1 (the vehicle 10A) in the CS mode enters Region A1 and until the vehicle exits from Region A1 or until the mode is switched to the CD mode. The control device 32A calculates the fuel efficiency of Vehicle Y1 in Region A1 by dividing the calculated traveling distance by the calculated $\Delta$F, and calculates the rate of fuel consumption (L/km) by taking a reciprocal of the fuel efficiency. The control device 32A calculates the traveling distance, the $\Delta$F, the fuel efficiency, and the rate of fuel consumption of the vehicles 10A in the CS mode in each region in the same way. Accordingly, the database 62 is generated.

In the second embodiment, unlike the first embodiment, the HV travelable range in addition to the EV travelable range is displayed on the display device 18 (FIG. 10). In the vehicle 10A, electric power stored in the power storage device 15 is basically first consumed in the CD mode and then fuel stored in the fuel tank 81 is consumed in the CS mode. That is, a user of the vehicle 10A often drives the vehicle 10A while finally confirming the HV travelable range. Accordingly, when the HV travelable range is not displayed to be longer than the actual HV travelable range, a great merit is not given to the user even when the EV travelable range is displayed to be longer than the actual EV travelable range.

Therefore, in the vehicle 10A according to the second embodiment, the control device 19A calculates the EV travelable range based on the second rate of electric power consumption and calculates the HV travelable range based on the larger traveling load of the first and second rates of fuel consumption. The EV travelable range does not need to be calculated based on the second rate of electric power consumption, but may be calculated, for example, based on the first rate of electric power consumption.

The second rate of electric power consumption is a rate of electric power consumption which is calculated with reference to the database 60 by the server 30A. The second rate of fuel consumption is a rate of fuel consumption which is calculated with reference to the database 62 by the server 30A.

First, an example of the method of calculating the second rate of electric power consumption will be described below. The vehicle of interest 11A transmits data (GPS data) indicating the current traveling region to the server 30A. The control device 32A of the server 30A retrieves the rates of electric power consumption of the other vehicles 12A in the CD mode correlated with the current traveling region of the vehicle of interest 11A from the database 60 (FIG. 11). When the rates of electric power consumption of a plurality of other vehicles 12A are found, the control device 32A calculates the second rate of electric power consumption by taking an average of the plurality of found rates of electric power consumption. The control device 32A controls the communication device 31 such that it transmits the calculated second rate of electric power consumption to the vehicle of interest 11A. Accordingly, the vehicle of interest 11A can receive the second rate of electric power consumption.

An example of the method of calculating the second rate of fuel consumption will be described below. Calculation of the second rate of fuel consumption is performed in parallel with calculation of the second rate of electric power consumption in the server 30A. The vehicle of interest 11A transmits data (the GPS data) indicating a current traveling region to the server 30A. The control device 32A of the server 30A retrieves the rates of fuel consumption of the other vehicles 12A in the CS mode, which are correlated with the current traveling region of the vehicle of interest 11A, from the database 62 (FIG. 12). When a plurality of rates of fuel consumption of a plurality of other vehicles 12A are found, the control device 32A calculates the second rate of fuel consumption by taking an average of the plurality of found rates of fuel consumption. The control device 32A controls the communication device 31 such that it transmits the calculated second rate of fuel consumption to the vehicle of interest 11A. Accordingly, the vehicle of interest 11A can receive the second rate of fuel consumption.

As described above, in the second embodiment, the HV travelable range is calculated based on the greater rate of fuel consumption of the first and second rates of fuel consumption. Accordingly, when the second rate of fuel consumption is greater than the first rate of fuel consumption, the HV travelable range is calculated to be shorter than that when the HV travelable range is calculated using only the first rate of fuel consumption. As a result, according to the vehicle 10A, it is possible to reduce a likelihood that the actual HV travelable range will be shorter than the calculated HV travelable range and to reduce a likelihood that the total travelable range using electric power and fuel (the EV travelable range+the HV travelable range) will be calculated to be longer than the actual travelable range.

Figure 13:
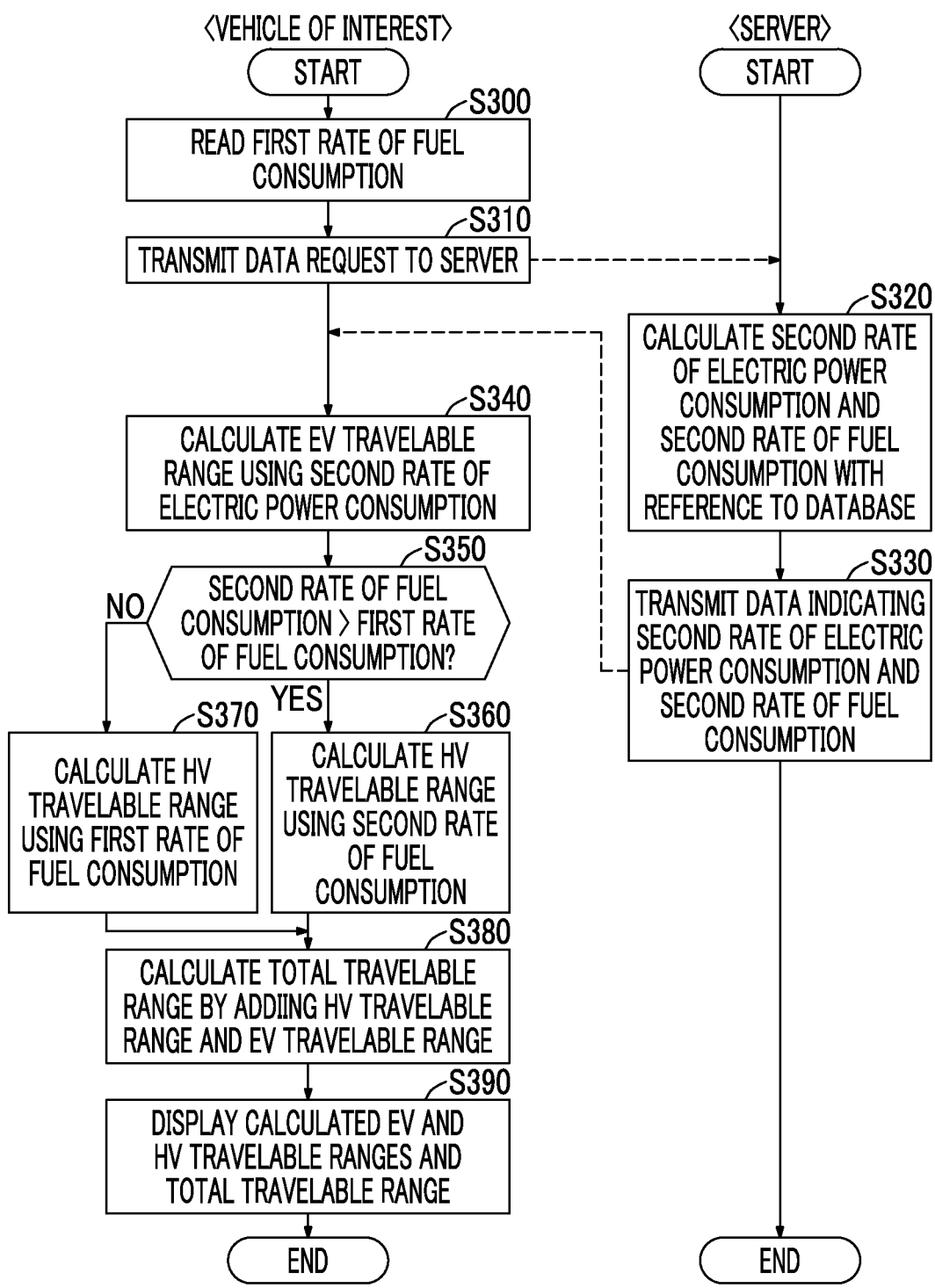
FIG. 13 is a flowchart illustrating routines which are performed in a vehicle of interest and a server to display various travelable ranges on a display device.

(Routine of performing a process of displaying a travelable range) FIG. 13 is a flowchart illustrating routines which are performed by the vehicle of interest 11A and the server 30A to display various travelable ranges on the display device 18 in the second embodiment. The routine illustrated in the left flowchart is performed by the vehicle of interest 11A. The routine illustrated in the right flowchart is performed by the server 30A. The routines illustrated in the flowcharts are periodically performed, for example, during operation of the control devices 19A and 32A.

Referring to FIG. 13, the control device 19A reads the first rate of fuel consumption, which is calculated based on the traveling results (the traveling distance and the ΔF) of the vehicle of interest 11A, from the internal memory (Step S300). The control device 19A acquires the GPS data from the navigation device 29 and controls the communication device 17 such that it transmits the acquired GPS data and a data request for the second rate of electric power consumption and the second rate of fuel consumption to the server 30A (Step S310).

When the server 30A receives the data request from the vehicle of interest 11A via the communication device 31, the control device 32A calculates the second rate of electric power consumption and the second rate of fuel consumption (hereinafter also referred to as a "second rate of energy consumption" together) in the traveling region of the vehicle of interest 11A (a region including the position indicated by the received GPS data) with reference to the databases 60 and 62 (FIGS. 11 and 12) (Step S320). The control device 32A controls the communication device 31 such that it transmits the calculated second rate of energy consumption to the vehicle of interest 11A (Step S330).

After the data request is transmitted to the server 30A in Step S310, the control device 19A monitors whether data indicating the second rate of energy consumption is received from the server 30A. When it is confirmed that data indicating the second rate of energy consumption is received from the server 30A, the control device 19A calculates the EV travelable range using the second rate of electric power consumption (and the residual amount of electric power of the power storage device 15) (Step S340).

Thereafter, the control device 19A determines whether the second rate of fuel consumption is greater than the first rate of fuel consumption (which has been read in Step S300) (Step S350).

When it is determined that the second rate of fuel consumption is greater than the first rate of fuel consumption (YES in Step S350), the control device 19A calculates the HV travelable range using the second rate of fuel consumption (and the residual amount of fuel of the fuel tank 81) (Step S360). On the other hand, when it is determined that the second rate of fuel consumption is equal to or less than the first rate of fuel consumption (NO in Step S350), the control device 19A calculates the HV travelable range using the first rate of fuel consumption (and the residual amount of fuel of the fuel tank 81) (Step S370).

The control device 19A calculates the total travelable range by adding the calculated EV travelable range and the calculated HV travelable range (Step S380). Thereafter, the control device 19A controls the display device 18 such that the EV travelable range, the HV travelable range, and the total travelable range are displayed (Step S390).

As described above, in the vehicle 10A according to the second embodiment, the control device 19A calculates the HV travelable range based on the greater rate of fuel consumption of the first and second rates of fuel consumption. Accordingly, according to the vehicle 10A, it is possible to reduce a likelihood that the actual HV travelable range will be shorter than the calculated HV travelable range.

Third Embodiment

In the PHV such as the vehicle 10A according to the second embodiment, fuel may run out earlier than electric power, which is not frequent. For example, it is assumed that the power storage device 15 is fully charged using the charging stand 40 in a state in which the residual amount of fuel is very small. Then, since the HV traveling may be performed in the CD mode, fuel may run out earlier than electric power in this case.

When fuel runs out earlier than electric power, a user drives the vehicle while finally confirming the EV travelable range. Accordingly, it is important that the EV travelable range longer than the actual EV travelable range is not displayed on the display device 18.

In a vehicle 10B according to a third embodiment, when there is a high likelihood that fuel will run out earlier than electric power, a scheme for not allowing the EV travelable range to be calculated longer than the actual EV travelable range is conceivable. This will be described below in detail.

The configurations of the vehicle 10B and the server 30B according to the third embodiment will be described below with reference to FIG. 8. The same elements as in the second embodiment will be repeatedly described.

The server 30B includes a control device 32B. The control device 32B has a CPU and a memory, which are not illustrated, built therein and is configured to control the devices (such as the communication device 31 and the HDD 33) of the server 30B in accordance with a control program stored in the memory.

The vehicle 10B includes a control device 19B. The control device 19B has a CPU and a memory, which are not illustrated, built therein and is configured to control the devices (such as the charger 14, the motor driving device 16, the communication device 17, the display device 18, the navigation device 29, and the engine 80) of the vehicle 10B based on information stored in the memory or information from various sensors.

When there is a high likelihood that fuel will run out earlier than electric power, the control device 19B calculates the EV travelable range based on the greater rate of electric power consumption of the first and second rates of electric power consumption when the residual amount of fuel in the fuel tank 81 is equal to or less than a predetermined amount in the CD mode (when the SOC of the power storage device 15 is greater than the predetermined value SL (FIG. 9)) in order not to calculate a range longer than an actual range as the EV travelable range.

Accordingly, when the second rate of electric power consumption is greater than the first rate of electric power consumption, the EV travelable range is calculated to be shorter than that when the EV travelable range is calculated using only the first rate of electric power consumption. As a result, according to the vehicle 10B, when there is a high likelihood that fuel will run out earlier than electric power (when the SOC of the power storage device 15 is greater than the predetermined value SL and the residual amount of fuel in the fuel tank 81 is equal to or less than the predetermined amount), it is possible to reduce a likelihood that the actual EV travelable range will be shorter than the calculated EV travelable range.

When the residual amount of fuel in the fuel tank 81 is equal to or less than the predetermined amount in the CD mode, the control device 19B calculates the HV travelable range based on the first rate of fuel consumption. Since an influence which the driving practice of a user gives to the rate of fuel consumption is great in the HV traveling, it can be thought that use of the rate of fuel consumption which is calculated based on the result data of the vehicle of interest 11B is better than use of the rate of fuel consumption which is calculated based on the result data of the other vehicles 12B.

When the residual amount of fuel in the fuel tank 81 is greater than the predetermined amount in the CD mode, the control device 19B calculates the EV travelable range based on the second rate of electric power consumption. In this case, the EV travelable range does not need to be calculated based on the second rate of electric power consumption and may be calculated, for example, based on the first rate of electric power consumption. When the residual amount of fuel in the fuel tank 81 is greater than the predetermined amount in the CD mode, the control device 19B calculates the HV travelable range based on the first rate of fuel consumption.

FIG. 14 is a flowchart illustrating routines which are performed by the vehicle of interest 11B and the server 30B to display various travelable ranges on the display device 18 according to the third embodiment. The routine illustrated in the left flowchart is performed by the vehicle of interest 11B periodically during operation of the control device 19B when the control mode of the vehicle of interest 11B is the CD mode. The routine illustrated in the right flowchart is performed by the server 30.

Referring to FIG. 14, the control device 19B reads the first rate of electric power consumption and the first rate of fuel consumption from the internal memory (Step S400). The control device 19B acquires the GPS data from the navigation device 29 and controls the communication device 17 such that it transmits the acquired GPS data and a data request for the second rate of electric power consumption to the server 30B (Step S405).

When the data request is received from the vehicle of interest 11B via the communication device 31, the control device 32B calculates the second rate of electric power consumption in the traveling region of the vehicle of interest 11B (a region including the position indicated by the received GPS data) with reference to the database 60 (FIG. 11) (Step S410). The control device 32B controls the communication device 31 such that it transmits the calculated second rate of electric power consumption to the vehicle of interest 11B (Step S415).

After the data request is transmitted to the server 30B in Step S405, the control device 19B monitors whether data indicating the second rate of electric power consumption is received from the server 30B. When it is confirmed that data indicating the second rate of electric power consumption is received from the server 30B, the control device 19B first calculates the HV travelable range using the first rate of fuel consumption (which has been read in Step S400) (Step S420).

Thereafter, the control device 19B determines whether the residual amount of fuel in the fuel tank 81 is greater than a predetermined value RQ1 (Step S425). The predetermined value RQ1 is a value which is determined in advance. When it is determined that the residual amount of fuel is equal to or less than the predetermined amount RQ1 (NO in Step S425), the control device 19B determines whether the second rate of electric power consumption is greater than the first rate of electric power consumption (which has been read in Step S400) (Step S430).

When it is determined that the second rate of electric power consumption is greater than the first rate of electric power consumption (YES in Step S430) or when it is determined in Step S425 that the residual amount of fuel is greater than the predetermined amount RQ1 (YES in Step S425), the control device 19B calculates the EV travelable range using the second rate of electric power consumption (and the residual amount of fuel of the power storage device 15) (Step S435). On the other hand, when it is determined that the second rate of electric power consumption is equal to or less than the first rate of electric power consumption (NO in Step S430), the control device 19B calculates the EV travelable range using the first rate of electric power consumption (and the residual amount of fuel of the power storage device 15) (Step S440).

The control device 19B calculates the total travelable range by adding the calculated EV travelable range and the calculated HV travelable range (Step S445). Thereafter, the control device 19B controls the display device 18 such that the EV travelable range, the HV travelable range, and the total travelable range are displayed (Step S450).

As described above, in the vehicle 10B according to the third embodiment, the control device 19B calculates the EV travelable range based on the larger rate of electric power consumption of the first and second rates of electric power consumption when there is a high likelihood that fuel will run out earlier than electric power in the CD mode. Accordingly, according to the vehicle 10B, when there is a high likelihood that fuel will run out earlier than electric power in the CD mode, it is possible to reduce a likelihood that the actual EV travelable range will be shorter than the calculated EV travelable range.

Other Embodiments

The first to third embodiments have been described above. However, the present disclosure is not limited to the first to third embodiments. Other embodiments will be described below.

In the first embodiment, it is assumed that the vehicle 10 is an electric vehicle. However, the vehicle 10 is not limited to the electric vehicle, and may be, for example, a hybrid vehicle (which includes a PHV) or a vehicle (a conveyor car) not including a traveling motor. For example, when the vehicle 10 is a hybrid vehicle, the travelable range based on current electric power and a current residual amount of fuel may be calculated using the larger rate of energy consumption of a rate of energy consumption (a rate of electric power consumption and a rate of fuel consumption) which is calculated based on the traveling results of the vehicle of interest 11 and a rate of energy consumption which is calculated based on the traveling results of the other vehicles 12. When the vehicle 10 is a conveyor car, the travelable range based on a current residual amount of fuel may be calculated using the larger rate of fuel consumption of the rate of fuel consumption which is calculated based on the traveling results of the vehicle of interest 11 and the rate of fuel consumption which is calculated based on the traveling results of the other vehicles 12.

In the first embodiment, the EV travelable range is calculated based on the larger rate of electric power consumption of the first and second rates of electric power consumption. However, the method of calculating the EV travelable range is not limited to such a method. For example, the EV travelable range may be calculated using the electric power efficiency (a travelable range with power of 1 Wh) instead of the rate of electric power consumption. In this case, the control device 19 may calculate the EV travelable range based on the smaller electric power efficiency (the electric power efficiency in which the EV travelable range is shorter) of the electric power efficiency which is calculated based on the traveling results of the vehicle of interest and the electric power efficiency which is calculated based on the result data collected in the server 30 (the electric power efficiency in the traveling region of the vehicle of interest). Accordingly, similarly to the first embodiment, it is possible to reduce a likelihood that the actual EV travelable range will be shorter than the calculated EV travelable range.

In the first embodiment, the EV travelable range may be calculated, for example, using "ΔSOC (%) per km" instead of the rate of electric power consumption. In this case, the control device 19 may calculate the EV travelable range based on the larger "ΔSOC (%) per km" (the "ΔSOC (%) per km" in which the EV travelable range is shorter) of the "ΔSOC (%) per km" which is calculated based on the traveling results of the vehicle of interest and the "ΔSOC (%) per km" which is calculated based on the result data collected I the server 30. Accordingly, similarly to the first embodiment, it is possible to reduce a likelihood that the actual EV travelable range will be shorter than the calculated EV travelable range.

In the second embodiment, the HV travelable range is calculated based on the larger rate of fuel consumption of the first and second rates of fuel consumption. However, the method of calculating the HV travelable range is not limited to such a method. For example, the HV travelable range may be calculated using the fuel efficiency (a travelable range with fuel of 1 L) instead of the rate of fuel consumption. In this case, the control device 19A may calculate the HV travelable range based on the smaller fuel efficiency (the fuel efficiency in which the HV travelable range is shorter) which is calculated based on the traveling results of the vehicle of interest and the fuel efficiency which is calculated based on the result data collected in the server 30A (the fuel efficiency in the traveling region of the vehicle of interest). Accordingly, similarly to the second embodiment, it is possible to reduce a likelihood that the actual HV travelable range will be shorter than the calculated HV travelable range.

In the second embodiment, the control device 19A may calculate the HV travelable range, for example, using "Δ(amount of fuel/capacity of fuel tank) (%) per km" instead of the rate of fuel consumption. In this case, the HV travelable range may be calculated based on the larger "Δ(amount of fuel/capacity of fuel tank) (%) per km" (the "Δ(amount of fuel/capacity of fuel tank) (%) per km" in which the HV travelable range is shorter) of the "Δ(amount of fuel/capacity of fuel tank) (%) per km" which is calculated based on the traveling results of the vehicle of interest and the "Δ(amount of fuel/capacity of fuel tank) (%) per km" which is calculated based on the result data collected in the server 30A. Accordingly, similarly to the second embodiment, it is possible to reduce a likelihood that the actual HV travelable range will be shorter than the calculated HV travelable range.

In the third embodiment, when the SOC of the power storage device 15 is greater than the predetermined value and the residual amount of fuel in the fuel tank 81 is equal to or less than the predetermined amount, the EV travelable range is calculated based on the larger rate of electric power consumption of the first and second rates of electric power consumption. However, the method of calculating the EV travelable range is not limited to such a method. For example, the EV travelable range may be calculated using the electric power efficiency (a travelable range with power of 1 Wh) instead of the rate of electric power consumption. That is, when the SOC of the power storage device 15 is greater than the predetermined value and the residual amount of fuel in the fuel tank 81 is equal to or less than the predetermined amount, the control device 19B may calculate the EV travelable range based on the smaller electric power efficiency (the electric power efficiency in which the EV travelable range is shorter) of the electric power efficiency which is calculated based on the traveling results of the vehicle of interest and the electric power efficiency which is calculated based on the result data collected in the server 30 (the electric power efficiency in the traveling region of the vehicle of interest). Accordingly, similarly to the third embodiment, it is possible to reduce a likelihood that the actual EV travelable range will be shorter than the calculated EV travelable range when there is a high likelihood that fuel will run out earlier than electric power in the CD mode.

In the third embodiment, for example, the EV travelable range may be calculated using "ΔSOC (%) per km" instead of the rate of electric power consumption. That is, when the SOC of the power storage device 15 is greater than the predetermined value and the residual amount of fuel in the fuel tank 81 is equal to or less than the predetermined amount, the control device 19B may calculate the EV travelable range based on the larger "ΔSOC (%) per km" (the "ΔSOC (%) per km" in which the EV travelable range is shorter) of the "ΔSOC (%) per km" which is calculated based on the traveling results of the vehicle of interest and the "ΔSOC (%) per km" which is calculated based on the result data collected in the server 30B. Accordingly, similarly to the third embodiment, it is possible to reduce a likelihood that the actual EV travelable range will be shorter than the calculated EV travelable range when there is a high likelihood that fuel will run out earlier than electric power in the CD mode.

In the first to third embodiments, the second rate of electric power consumption and/or the second rate of fuel consumption is calculated based on the rates of electric power consumption and/or the rates of fuel consumption of the other vehicles (12, 12A, 12B). However, the method of calculating the second rate of electric power consumption and/or the second rate of fuel consumption is not limited thereto. For example, the second rate of electric power consumption and/or the second rate of fuel consumption may be calculated based on the rates of electric power consumption and/or the rate of fuel consumption of a plurality of vehicles (10, 10A, 10B) including the vehicle of interest and the other vehicles.

In the first to third embodiments, the vehicles 10, 10A, and 10B are always connected to the network. However, the vehicles 10, 10A, and 10B do not need to be always connected to the network. The vehicles 10, 10A, and 10B may be, for example, connected vehicles that can communicate with the servers 30, 30A, and 30B if necessary.

In the first to third embodiments, result data indicating traveling results is transmitted from the vehicles of the same model (the vehicles 10, 10A, and 10B) to the servers 30, 30A, and 30B. However, result data may be transmitted from vehicles of a plurality of models to the servers 30, 30A, and 30B.

In this case, for example, in the first embodiment, the control device 32 may retrieve the rates of electric power consumption of the other vehicles 12 of the same model as the vehicle of interest 11 from the database 50 and calculate the second rate of electric power consumption based on the found result data.

In this case, for example, in the first embodiment, the second rate of electric power consumption may be calculated using the following method. First, it is assumed that information of an electric power efficiency in a life span of each vehicle is stored in the database 50. The electric power efficiency in a life span refers to total electric power efficiencies from shipment of the vehicle. For example, it is assumed that a data request is transmitted from the vehicle of interest 11 to the server 30 during traveling of the vehicle of interest 11 in Region A1. When the data request is received, the control device 32 calculates (electric power efficiency in Region A1)/(electric power efficiency in life span) for each vehicle with reference to the database 50 (FIG. 3), and calculates an average value of the calculated values. The control device 32 controls the communication device 31 such that it transmits the calculated average value to the vehicle of interest 11. When the average value is received, the control device 19 calculates the product of the electric power efficiency in a life span of the vehicle of interest 11 and the received average value and calculates the second rate of electric power consumption by taking a reciprocal of the calculation result. According to this method, even when there is a greater difference in weight or the like between different vehicle models, it is possible to calculate the second rate of electric power consumption with some high accuracy.

In the first to third embodiments, the EV travelable range which is calculated based on the larger rate of electric power consumption of the first and second rates of electric power consumption is displayed on the display device 18, but, for example, the control devices 19 and 19B may control the display device 18 such that the EV travelable range which is calculated based on the smaller rate of electric power consumption of the first and second rates of electric power consumption is displayed in addition. In this case, a user can recognize the EV travelable range which is calculated based on the larger rate of electric power consumption of the first and second rates of electric power consumption by viewing the display device 18.

In the second embodiment, the HV travelable range which is calculated based on the larger rate of fuel consumption of the first and second rates of fuel consumption is displayed on the display device 18, but, for example, the control device 19A may control the display device 18 such that the HV travelable range which is calculated based on the smaller rate of fuel consumption of the first and second rates of fuel consumptions is displayed in addition. In this case, a user can recognize the HV travelable range which is calculated based on the larger rate of fuel consumption of the first and second rates of fuel consumption by viewing the display device 18.

In the second and third embodiments, the vehicles 10A and 10B are PHVs. However, the vehicles 10A and 10B are not limited to the PHVs, and may be hybrid vehicles which cannot cope with charging using a charging stand 40 (external charging). In this case, the hybrid vehicles can be set to one of the CD mode and the CS mode.

In the second and third embodiments, the second rate of electric power consumption and/or the second rate of fuel consumption (the second rate of electric power consumption and the second rate of fuel consumption in the second embodiment and the second rate of electric power consumption in the third embodiment) are calculated by the servers 30A and 30B. However, the second rate of electric power consumption and/or the second rate of fuel consumption do not need to be calculated by the servers 30A and 30B. For example, result data of the other vehicles 12A and 12B may be transmitted from the servers 30A and 30B to the vehicles of interest 11A and 11B and the second rate of electric power consumption and/or the second rate of fuel consumption may be calculated based on the received result data by the vehicles of interest 11A and 11B. Even when the second rate of electric power consumption and/or the second rate of fuel consumption are calculated by the vehicles of interest 11A and 11B, various travelable ranges which are calculated using the calculated second rate of electric power consumption and/or the calculated second rate of fuel consumption or using the first rate of electric power consumption and/or the first rate of fuel consumption is also displayed on the display device 18.

It should be thought that the above-disclosed embodiments are exemplary but not restrictive from all points of view. The scope of the invention is defined by the appended claims, not by the above description, and is intended to include all modifications within meanings and scope equivalent to the claims.

What is claimed is:

1. A connected vehicle configured to operate in a charge depleting mode, the connected vehicle comprising:
   an internal combustion engine;
   a fuel tank configured to store fuel of the internal combustion engine;
   an electrical rotary machine;
   a power storage device that is electrically connected to supply electric power to the electrical rotary machine, wherein the power storage device comprises one of a battery and a capacitor; and
   a controller configured to:

receive an output of a fuel sensor that indicates a residual amount of fuel in the fuel tank, the residual amount of fuel being greater than zero;

calculate a state of charge of the power storage device using an output of a sensor that detects a current of the power storage device;

receive result data from a server configured to collect the result data, the result data indicating traveling results of a plurality of vehicles other than the connected vehicle;

calculate a travelable range of the connected vehicle using a sum of (a) hybrid travelable range using the residual amount of fuel and a rate of fuel consumption calculated by the controller and (b) electric travelable range using the state of charge of the power storage device and a rate of electric power consumption calculated by the controller, the travelable range being calculated under a first condition and a second condition:

under the first condition, calculate the travelable range using the electric travelable range that is a shorter distance from among the electric travelable range calculated using (a) data from the connected vehicle indicating only traveling results of the connected vehicle correlating to the travelable range, and (b) the electric travelable range calculated using the result data from the server, the first condition being when the state of charge of the power storage device is greater than a minimum value for operating in the charge depleting mode and the residual amount of fuel is equal to or less than a predetermined non-zero amount at which the residual amount of fuel will run out earlier than the state of charge of the power storage device using the shorter distance, and under the second condition, calculate the travelable range using one of the data from the connected vehicle and the result data from the server, the second condition being when the state of charge of the power storage device is greater than the minimum value for operating in the charge depleting mode and the residual amount of fuel is greater than the predetermined non-zero amount at which the residual amount of fuel will run out earlier than the state of charge of the power storage device using the one of the data from the connected vehicle and the result data from the server, wherein the result data from the server is correlated with the travelable range; and generate a signal corresponding to the travelable range calculated, wherein the charge depleting mode allows (a) activation of the internal combustion engine and (b) regenerative electric power generation during deceleration but (c) a portion of operation of the connected vehicle where the state of charge decreases is greater than a portion of operation of the connected vehicle where the state of charge does not decrease to result in an overall downward trend of the state of charge of the power storage device during the charge depleting mode.

2. The connected vehicle according to claim 1, further comprising a display, wherein the controller is configured to control the display using the signal such that an image indicating the travelable range is displayed.

* * * * *